(12) United States Patent
Nittur Sridhar et al.

(10) Patent No.: US 12,367,248 B2
(45) Date of Patent: Jul. 22, 2025

(54) HARDWARE-AWARE MACHINE LEARNING MODEL SEARCH MECHANISMS

(71) Applicant: Intel Corporation, Santa Clara, CA (US)

(72) Inventors: Sharath Nittur Sridhar, San Diego, CA (US); Anthony Sarah, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 17/504,996

(22) Filed: Oct. 19, 2021

(65) Prior Publication Data

US 2022/0035877 A1     Feb. 3, 2022

(51) Int. Cl.
*G06F 16/953* (2019.01)

(52) U.S. Cl.
CPC .................................. *G06F 16/953* (2019.01)

(58) Field of Classification Search
CPC ...................................................... G06F 16/953
See application file for complete search history.

(56) References Cited

U.S. PATENT DOCUMENTS

| | | | |
|---|---|---|---|
| 10,528,891 B1* | 1/2020 | Cheng | G06N 20/20 |
| 10,744,372 B2 | 8/2020 | Meyerson | |
| 10,803,392 B1 | 10/2020 | Khan et al. | |
| 11,347,995 B2* | 5/2022 | Bender | G06N 3/04 |
| 11,443,162 B2* | 9/2022 | Yang | G06N 3/04 |
| 11,527,308 B2 | 12/2022 | Shahrzad | |
| 11,531,861 B2* | 12/2022 | Tan | G06N 3/044 |
| 11,620,515 B2* | 4/2023 | Liu | G06F 40/30 706/45 |

(Continued)

FOREIGN PATENT DOCUMENTS

| | | |
|---|---|---|
| EP | 3975060 A1 | 3/2022 |
| WO | WO2021158313 A1 | 8/2021 |

OTHER PUBLICATIONS

Song Han et al., "Deep Compression: Compressing Deep Neural Networks with Pruning, Trained Quantization and Huffman Coding", arXiv:1510.00149v5 [cs.CV], 14 pages (Feb. 15, 2016).

(Continued)

*Primary Examiner* — Mark E Hershley
(74) *Attorney, Agent, or Firm* — HANLEY, FLIGHT & ZIMMERMAN, LLC

(57) ABSTRACT

The present disclosure is related to framework for automatically and efficiently finding machine learning (ML) architectures that generalize well across multiple artificial intelligence (AI) and/or ML domains, AI/ML tasks, and datasets. The ML architecture search framework accepts a list of tasks and corresponding datasets as inputs, and may also include relevancy scores/weights for each item in the input. A combined performance metric is generated, where this combined performance metric quantifies the performance of the ML architecture across all the specified AI/ML domains, AI/ML tasks, and datasets. The system then performs a multi-objective ML architecture search with the combined performance metric, along with hardware-specific performance metrics as the objectives. Other embodiments may be described and/or claimed.

25 Claims, 6 Drawing Sheets

(56) References Cited

U.S. PATENT DOCUMENTS

| | | | |
|---|---|---|---|
| 2007/0208548 A1* | 9/2007 | McConaghy | G06F 30/367 |
| | | | 703/2 |
| 2010/0325072 A1 | 12/2010 | Truemper | |
| 2013/0185234 A1 | 7/2013 | Arora | |
| 2015/0095253 A1 | 4/2015 | Lim | |
| 2016/0328644 A1 | 11/2016 | Lin et al. | |
| 2017/0220928 A1 | 8/2017 | Hajizadeh | |
| 2017/0261949 A1* | 9/2017 | Hoffmann | G06N 7/01 |
| 2018/0137219 A1 | 5/2018 | Goldfarb | |
| 2019/0005390 A1* | 1/2019 | Stitt | G06N 7/01 |
| 2019/0019096 A1* | 1/2019 | Yoshida | G06F 16/9024 |
| 2019/0279102 A1 | 9/2019 | Cataltepe | |
| 2019/0286984 A1* | 9/2019 | Vasudevan | G06N 5/01 |
| 2019/0347548 A1* | 11/2019 | Amizadeh | G06N 3/08 |
| 2019/0354837 A1* | 11/2019 | Zhou | G06N 3/044 |
| 2019/0370659 A1* | 12/2019 | Dean | G06F 11/3495 |
| 2020/0044955 A1* | 2/2020 | Pugaczewski | H04L 41/5025 |
| 2020/0057965 A1* | 2/2020 | Howard | A61P 25/28 |
| 2020/0104710 A1* | 4/2020 | Vasudevan | G06N 3/045 |
| 2020/0104715 A1* | 4/2020 | Denolf | G06N 3/045 |
| 2020/0125545 A1* | 4/2020 | Idicula | G06N 20/20 |
| 2020/0143227 A1* | 5/2020 | Tan | G06N 3/084 |
| 2020/0143243 A1 | 5/2020 | Liang | |
| 2020/0167593 A1* | 5/2020 | Kim | G06N 20/00 |
| 2020/0193266 A1* | 6/2020 | Scheidegger | G06N 3/04 |
| 2020/0272909 A1 | 8/2020 | Parmentier | |
| 2020/0311561 A1 | 10/2020 | Naaman et al. | |
| 2020/0320399 A1* | 10/2020 | Huang | G06N 3/086 |
| 2020/0349050 A1* | 11/2020 | Ghobadi | G06F 11/302 |
| 2020/0357486 A1* | 11/2020 | Kok | G06N 20/00 |
| 2020/0401899 A1* | 12/2020 | Dohan | G06N 3/048 |
| 2021/0034924 A1* | 2/2021 | McCourt | G06N 20/00 |
| 2021/0056378 A1 | 2/2021 | Yang | |
| 2021/0064627 A1* | 3/2021 | Kleiner | G06F 16/248 |
| 2021/0081763 A1* | 3/2021 | Abdelfattah | G06N 20/00 |
| 2021/0097383 A1* | 4/2021 | Kaur | G06F 11/3466 |
| 2021/0097443 A1 | 4/2021 | Li | |
| 2021/0110140 A1 | 4/2021 | Munoz et al. | |
| 2021/0110276 A1 | 4/2021 | Chu | |
| 2021/0110302 A1* | 4/2021 | Nam | G06N 5/01 |
| 2021/0158929 A1* | 5/2021 | Sjolund | G06N 3/045 |
| 2021/0303967 A1* | 9/2021 | Bender | G06N 3/08 |
| 2021/0304061 A1 | 9/2021 | Kolar et al. | |
| 2021/0350233 A1 | 11/2021 | Saboori et al. | |
| 2021/0357744 A1* | 11/2021 | Mittal | G06F 18/213 |
| 2021/0357959 A1* | 11/2021 | Cella | G06F 18/2178 |
| 2021/0390376 A1 | 12/2021 | Byrne | |
| 2022/0012089 A1* | 1/2022 | Nasr-Azadani | G06N 5/04 |
| 2022/0019880 A1 | 1/2022 | Dasgupta | |
| 2022/0027792 A1* | 1/2022 | Cummings | G06N 20/00 |
| 2022/0035877 A1* | 2/2022 | Nittur Sridhar | G06N 3/086 |
| 2022/0035878 A1* | 2/2022 | Sarah | G06F 16/953 |
| 2022/0036128 A1* | 2/2022 | Levanony | G06F 18/24 |
| 2022/0036194 A1 | 2/2022 | Sundaresan | |
| 2022/0172038 A1* | 6/2022 | Chen | G06N 3/045 |
| 2022/0180125 A1 | 6/2022 | Shen et al. | |
| 2022/0198217 A1* | 6/2022 | Dong | G06F 18/2163 |
| 2022/0198260 A1 | 6/2022 | Xue | |
| 2022/0230048 A1 | 7/2022 | Li | |
| 2022/0269835 A1* | 8/2022 | Yang | G06N 7/01 |
| 2022/0277231 A1 | 9/2022 | Ostergaard et al. | |
| 2022/0284582 A1 | 9/2022 | Yang | |
| 2022/0328128 A1* | 10/2022 | Kok | G06N 20/00 |
| 2022/0348903 A1* | 11/2022 | Ranganathan | G16B 25/10 |
| 2022/0398500 A1* | 12/2022 | Singhal | G06N 3/098 |
| 2022/0414534 A1 | 12/2022 | Ananthanarayanan et al. | |
| 2023/0032748 A1* | 2/2023 | Sodhi | H04L 41/16 |
| 2023/0274151 A1* | 8/2023 | Xu | G06N 3/086 |
| | | | 706/15 |
| 2023/0325711 A1 | 10/2023 | Haraldson et al. | |
| 2024/0007414 A1 | 1/2024 | Jain | |
| 2024/0046148 A1 | 2/2024 | Bega et al. | |
| 2024/0289687 A1 | 8/2024 | Kumar et al. | |
| 2024/0362472 A1 | 10/2024 | Fu et al. | |

OTHER PUBLICATIONS

Andrew Howard et al., "Searching for MobileNetV3", Proceedings of the IEEE/Computer Vision Foundation (CVF) Int'l Conference on Computer Vision (ICCV 2019), pp. 1314-1324 (Oct. 2019).

Liam Li et al., "Geometry-Aware Gradient Algorithms for Neural Architecture Search", arXiv:2004.07802v5 [cs.LG], 25 pages (Mar. 18, 2021).

Mu Li et al., "Scaling Distributed Machine Learning with the Parameter Server", 11th USENIX Symposium on Operating Systems Design and Implementation (OSDI '14), pp. 583-598 (Oct. 2014).

Misha Khodak et al., "In defense of weight-sharing for neural architecture search: an optimization perspective", Machine Learning Blog Carnegie Mellon University (ML@CMU), 12 pages (Jul. 17, 2020), https://blog.ml.cmu.edu/2020/07/17/in-defense-of-weight-sharing-for-nas/.

Hieu Pham et al. "Efficient Neural Architecture Search via Parameters Sharing", Proceedings of the 35th Int'l Conference on Machine Learning (PMLR), vol. 80, pp. 4095-4104 (2018).

Aurick Qiao et al., "Litz: Elastic Framework for High-Performance DistributedMachine Learning", 2018 USENIX Annual Technical Conference (USENIX ATC '18), pp. 631-643 (Jul. 2018).

Mohammad Rastegari et al. "XNOR-Net: Imagenet Classification Using Binary Convolutional Neural Networks", European Conference on Computer Vision (ECCV), Springer, Cham., pp. 525-542 (Oct. 8, 2016).

Lingxi Xie et al., "Weight-Sharing Neural Architecture Search: A Battle to Shrink the Optimization Gap", arXiv:2008.01475v2 [cs. CV], 24 pages (Aug. 5, 2020).

Yuge Zhang et al., "Deeper Insights Into Weight Sharing in Neural Architecture Search", arXiv:2001.01431v1 [cs.LG], 16 pages (Jan. 6, 2020).

Extended European Search Report mailed Jan. 2, 2023 for European Patent Application No. 22186944.9, 14 pages.

Tang et al., "A Semi-Supervised Assessor of Neural Architectures", arXiv:2005.06821v1 [cs.CV], arxiv.org, Cornell Univ. Library, Ithaca, NY, 10 pages (May 14, 2020).

Kokiopoulou et al., "Fast Task-Aware Architecture Inference", arXiv:1902.05781v1 [cs.LG], arxiv.org, Cornell Univ. Library, Ithaca, NY, 10 pages (Feb. 15, 2019).

Zichao Lu et al., "NSGANetV2: Evolutionary Multi-objective Surrogate—Assisted Neural Architecture Search", Computer Vision—ECCV 2020: 16th European Conference, Glasgow, UK, Aug. 23-28, 2020, pp. 35-51 (Aug. 2020).

Extended European Search Report mailed Jan. 10, 2023 for European Patent Application No. 22186932.4, 9 pages.

James Bergstra et al., "Algorithms for Hyper-Parameter Optimization", 2011, 9 pages, Advances in Neural Information Processing Systems 24 (NIPS 2011).

James Bergstra et al., "Random Search for Hyper-Parameter Optimization", Feb. 1, 2012, 25 pages, J. of Machine Learning Research, vol. 13, No. 2.

Han Cai et al., "Once-For-All: Train One Network and Specialize for Efficient Deployment", Apr. 29, 2020, 15 pages, arXiv:1908. 09791v5 [cs.LG].

Kalyanmoy Deb et al., "A Fast and Elitist Multiobjective Genetic Algorithm: NSGA-II", Apr. 2002, 16 pages, IEEE Transactions on Evolutionary Computation, vol. 6, No. 2.

Ian Dewancker et al., "Bayesian Optimization Primer", 2020, 4 pages. Retrieved from the Internet: http://static.sigopt.com/b/20a144d208ef255d3b981ce419667ec25d8412e2/static/pdf/SigOpt_Bayesian_Optimization_Primer.pdf.

Ian Dewancker et al., "Bayesian Optimization for Machine Learning: A Practical Guidebook", Dec. 14, 2016, 15 pages, arXiv preprint arXiv:1612.04858.

A.E. Eiben et al., "Introduction to Evolutionary Computing", 2015, 295 pages, second edition, Springer Heidelberg New York Dordrecht London.

Wenlan Huang et al., "Survey on Multi-Objective Evolutionary Algorithms", Aug. 1, 2019, 8 pages, IOP Conf. Series: J. of Physics: Conf. Series, vol. 1288, No. 1, p. 012057.

(56) References Cited

OTHER PUBLICATIONS

Christian Igel et al., "Covariance Matrix Adaptation for Multi-objective Optimization", 2007, pp. 1-28, Evolutionary Computation, vol. 15, No. 1.
Danilo Vasconcellos Vargas et al., "General Subpopulation Framework and Taming the Conflict Inside Populations", Jan. 2, 2019, 37 pages, arXiv:1901.00266v1 [cs.NE].
Dzmitry Bahdanau et al., "Neural Machine Translation by Jointly Learning to Align and Translate", May 19, 2016, 15 pages, arXiv:1409.0473v7 [cs.CL].
Irwan Bello et al., "Attention Augmented Convolutional Networks", 2019, pp. 3286-3295, Proceedings of the IEEE/CVF Int'l Conference on Computer Vision.
Cristian Buciluǎ et al., "Model Compression", Aug. 20, 2006, pp. 535-541, Proceedings of the 12th Assn. for Computing Machinery (ACM) Special Interest Group on Knowledge Discovery in Data (SIGKDD) Int'l Conference on Knowledge Discovery and Data Mining (KDD).
Liang-Chieh Chen et al., "Deeplab: Semantic Image Segmentation with Deep Convolutional Nets, Atrous Convolution, and Fully Connected CRFs", Apr. 27, 2017, pp. 834-848, IEEE transactions on pattern analysis and machine intelligence, vol. 40, No. 4.
Yu Cheng et al., "A Survey of Model Compression and Acceleration for Deep Neural Networks", Jun. 14, 2020, 10 pages, arXiv:1710.09282v9 [cs.LG].
Aston Zhang et al., "Dive into Deep Learning" Jul. 25, 2021, 323 pages, Release 0.17.0, chs. 4-10 (Jul. 25, 2021), available at: https://d2l.ai/.
Tim Dettmers et al., "Sparse Networks from Scratch: Faster Training without Losing Performance", Aug. 23, 2019, 14 pages, arXiv:1907.04840v2 [cs.LG].
Yu Cheng et al., "A Survey of Model Compression and Acceleration for Deep Neural Networks", Oct. 23, 2017, 10 pages, IEEE Signal Processing Magazine, Special Issue on Deep Learning for Image Understanding.
Jonathan Frankle et al., "The Lottery Ticket Hypothesis: Finding Sparse, Trainable Neural Networks", arXiv:1803.03635v5 [cs.LG], 42 pages (Mar. 4, 2019), https://arxiv.org/pdf/1803.03635.pdf.
Jianping Gou et al., "Knowledge distillation: A survey", Int'l J. of Comp. Vision, vol. 129, No. 6, pp. 1789-1819 (Jun. 2021), https://arxiv.org/pdf/2006.05525.pdf.
Lucas Hansen, "Tiny ImageNet Challenge Submission", CS231n: Convolutional Neural Networks for Visual Recognition, Stanford University, 6 pages (2015), http://cs231n.stanford.edu/reports/2015/pdfs/lucash_final.pdf.
Kaiming He et al., "Deep Residual Learning for Image Recognition", Proceedings of the IEEE conference on computer vision and pattern recognition 2016, pp. 770-778 (2016), https:/openaccess.thecvf.com/content_cvpr_2016/papers/He_Deep_Residual_Learning_CVPR_2016_paper.pdf.
Adrián Hernández et al., "Attention Mechanisms and Their Applications to Complex Systems", Entropy, vol. 23, No. 3, p. 283, 18 pages (Feb. 26, 2021), https://www.mdpi.com/1099-4300/23/3/283/htm.
Geoffrey Hinton et al., "Distilling the Knowledge in a Neural Network", arXiv preprint arXiv:1503.02531, 9 pages (Mar. 9, 2015), https://arxiv.org/pdf/1503.02531.pdf.
Le Hou et al., "High Resolution Medical Image Analysis with Spatial Partitioning", arXiv:1909.03108v3 [eess.IV], 5 pages (Sep. 12, 2019), https://arxiv.org/pdf/1909.03108.pdf.
Cheng-Zhi Anna Huang et al., "Music Transformer: Generating Music with Long-Term Structure", arXiv:1809.04281v3 [cs.LG], 14 pages (Dec. 12, 2018), https://arxiv.org/pdf/1809.04281.pdf.
Judit Acs, "Masking attention weights in PyTorch", Judit Ács's blog, 4 pages (Dec. 27, 2018; last visited Oct. 2, 2021), http://juditacs.github.io/2018/12/27/masked-attention.html.
Salman Khan et al., "Transformers in Vision: a Survey", arXiv:2101.01169v2 [cs.CV], 28 pages (Feb. 22, 2021), https://arxiv.org/pdf/2101.01169v2.pdf.

Taehyeon Kim et al., "Comparing Kullback-Leibler Divergence and Mean Squared Error Loss in Knowledge Distillation", 2021, pp. 2628-2635, (Proceedings of the Thirtieth International Joint Conference on Artificial Intelligence (IJCAI-21), 2021).
Taehyeon Kim et al., "Comparing Kullback-Leibler Divergence and Mean Squared Error Loss in Knowledge Distillation", May 19, 2021, 11 pages, arXiv:2105.08919 [cs.LG].
Salman Khan et al., "Transformers in Vision: A Survey", ACM Computing Surveys, 38 pages (Accepted Dec. 2021; available online Jan. 6, 2022), https://dl.acm.org/doi/abs/10.1145/3505244.
Kalyanmoy Deb, "Multi-Objective Optimization Using Evolutionary Algorithms", Indian Institute of Technology—Kanpur, Dept. of Mechanical Engineering, Kanpur, India, KanGAL Report No. 2011003, 24 pages (Feb. 10, 2011), https://www.egr.msu.edu/~kdeb/papers/k2011003.pdf.
Zhichao Lu et al., "NSGA-Net: Neural Architecture Search using Multi-Objective Genetic Algorithm", arXiv:1810.03522v2 [cs.CV], 13 pages (Apr. 18, 2019).
Yonglong Tian et al., "Contrastive Representation Distillation", arXiv:1910.10699v2 [cs.LG], 19 pages (Jan. 18, 2020).
Tianyun Zhang et al., "A Systematic DNN Weight Pruning Framework using Alternating Direction Method of Multipliers", Proceedings of the European Conference on Computer Vision (ECCV) 2018, in Lecture Notes in Computer Science book series (LNCS), vol. 11212, pp. 191-207 (Oct. 7, 2018), https://openaccess.thecvf.com/content_ECCV_2018/papers/Tianyun_Zhang_A_Systematic_DNN_ECCV_2018_paper.pdf.
Ashish Vaswani et al., "Attention Is All You Need", Advances in Neural Information Processing Systems 30 (NIPS 2017), pp. 5998-6008 (2017), https://proceedings.neurips.cc/paper/2017/file/3f5ee243547dee91fbd053c1c4a845aa-Paper.pdf.
Chunnan Wang et al., "Multi-Objective Neural Architecture Search Based on Diverse Structures and Adaptive Recommendation", arXiv:2007.02749v2 [cs.CV], 11 pages (Aug. 13, 2020), https://arxiv.org/pdf/2007.02749.pdf.
Sergey Zagoruyko et al., "Paying More Attention to Attention: Improving the Performance of Convolutional Neural Networks via Attention Transfer", arXiv:1612.03928v3 [cs.CV], 13 pages (Feb. 12, 2017), https://arxiv.org/pdf/1612.03928.pdf.
Chenzhuo Zhu et al., "Trained Ternary Quantization", arXiv:1612.01064v3 [cs.LG], 10 pages (Feb. 23, 2017), https://arxiv.org/pdf/1612.01064.pdf.
Barret Zoph et al., "Learning Transferable Architectures for Scalable Image Recognition", Proceedings of the IEEE conference on computer vision and pattern recognition 2018, pp. 8697-8710 (2018), https://openaccess.thecvf.com/content_cvpr_2018/papers/Zoph_Learning_Transferable_Architectures_CVPR_2018_paper.pdf.
"Intel Agilex FSeries 027 FPGA R25A Product Specifications" retrieved on Oct. 6, 2021, 3 pages. Retrieved from Internet at: https://www.intel.com/content/www/us/en/products/sku/208599/intel-agilex-fseries-027-fpga-r25a/specifications.html.
"Intel Atom x6413E Processor Product Specifications", retrieved on Oct. 6, 2021, 4 pages. Retrieved from Internet at https://ark.intel.com/content/www/us/en/ark/products/207908/intel-atom-x6413e-processor-1-5m-cache-up-to-3-00-ghz.html.
"Intel® Xeon® Platinum 8362 Processor Product Specifications" retrieved on Oct. 6, 2021, 4 pages. Retrieved from Internet at: https://www.intel.com/content/www/us/en/products/sku/217216/intel-xeon-platinum-8362-processor-48m-cache-2-80-ghz/specifications.html.
Mahrokh Javadi et al., "Combining Manhattan and Crowding distances in Decision Space for Multimodal Multi-objective Optimization Problems", Sep. 12, 2019, 6 pages, EUROGEN 2019.
Will Koehrsen, "A Conceptual Explanation of Bayesian Hyperparameter Optimization for Machine Learning", Jun. 28, 20218, 17 pages, Toward Data Science, available at: https://towardsdatascience.com/a-conceptual-explanation-of-bayesian-model-based-hyperparameter-optimization-for-machine-learning-b8172278050f.
Hanxiao Liu et al., "DARTS: Differentiable Architecture Search", Apr. 23, 2019, 13 pages, arXiv:1806.09055v2 [cs. _G].

(56) References Cited

OTHER PUBLICATIONS

Joseph Mellor et al., "Neural Architecture Search without Training", Jul. 1, 2021, pp. 7588-7598, Int'l Conference on Machine Learning, PMLR.

Jasper Snoek et al., "Practical Bayesian Optimization of Machine Learning Algorithms", Aug. 29, 2012, 9 pages, Advances in Neural Information Processing Systems 25 (NIPS 2012).

Eckart Zitzler et al., "SPEA2: Improving the Strength Pareto Evolutionary Algorithm", May 2001, 21 pages, Computer Engineering and Communication Networks Lab (TIK), Swiss Fed. Inst. of Tech. (ETH), Zurich, CH, TIK-Report 103.

Hanrui Wang et al., "HAT: Hardware-Aware Transformers for Efficient Natural Language Processing", May 28, 2020, 14 pages, arXiv:2005.14187v1 [cs.CL].

Hanrui Wang et al., "HAT: Hardware-Aware Transformers for Efficient Natural Language Processing", 2020, 37 bages, ACL 2020 Slides, available at: https://hat.mit.edu/assets/ACL20_HAT_HanruiWang.pdf.

Alex Krizhevsky et al., "Learning Multiple Layers of Features from Tiny Images", Master's Thesis, U. of Toronto, Citeseer, 60 pages (Apr. 8, 2009), https://www.cs.toronto.edu/~kriz/learning-features-2009-TR.pdf.

Souvik Kundu et al., "A Tunable Robust Pruning Framework Through Dynamic Network Rewiring of DNNS", arXiv:2011.03083v2 [cs.CV], 8 pages (Nov. 24, 2020).

Namhoon Lee et al., "SNIP: Single-Shot Network Pruning based on Connection Sensitivity", Int'l Conference on Learning Representations (ICLR) 2019, 15 pages (May 6, 2019).

Tsung-Yi Lin et al., "Feature Pyramid Networks for Object Detection", Proceedings of the IEEE Conference on Computer Vision and Pattern Recognition 2017, pp. 2117-2125 (2017).

Zhuang Liu et al., "Rethinking the Value of Network Pruning", arXiv:1810.05270v2 [cs.LG], 21 pages (Mar. 5, 2019).

Marc E. McDill, "Forest Resource Management", Penn State Univ., ch. 11, pp. 203-233 (Jun. 22, 1999), https://faculty.washington.edu/toths/Presentations/Lecture%202/Ch11_LPIntro.pdf.

Hesham Mostafa et al., "Parameter Efficient Training of Deep Convolutional Neural Networks by Dynamic Sparse Reparameterization", Proceedings of the 36th Int'l Conference on Machine Learning (PMLR), pp. 4646-4655 (May 24, 2019), http://proceedings.mlr.press/v97/mostafa19a/mostafa19a.pdf.

Junki Park et al., "OPTIMUS: Optimized Matrix Multiplication Structure for Transformer Neural Network Accelerator". Mar. 15, 2020, pp. 363-378, Proceedings of Machine Learning and Systems, vol. 2.

Prajit Ramachandran et al., "Stand-Alone Self-Attention in Vision Models", arXiv:1906.05909v1 [cs.CV], 15 pages (Jun. 13, 2019), https://arxiv.org/pdf/1906.05909.pdf.

Christian Szegedy et al., "Going Deeper with Convolutions", 2015 IEEE Conference on Computer Vision and Pattern Recognition (CVPR), pp. 1-9 (2015), doi: 10.1109/CVPR.2015.7298594.

Mohamed S. Abdelfattah et al., "Zero-Cost Proxies for Lightweight NAS", Mar. 19, 2021, 17 pages, arXiv:2101.08134v2 [cs.LG].

Edward Alibekov et al., "Proxy Functions for Approximate Reinforcement Learning", 2019, pp. 224-229, IFAC PapersOnLine 52-11.

Bowen Baker et al., "Designing Neural Network Architectures using Reinforcement Learning", Mar. 22, 2017, 18 pages, arXiv:1611.02167v3.

Han Cai et al., "Proxylessnas: Direct neural architecture search on target task and hardware", Feb. 23, 2019, 13 pages, arXiv:1812.00332v2 [cs.LG].

Olivier Chapelle et al., "Semi-Supervised Learning", 2006, 524 pages, MIT Press, Cambridge MA, London England.

Thomas Elsken et al., "Neural architecture search: A survey", Mar. 19, 2019, 21 pages, J. of Machine Learning Research, vol. 20, No. 1.

Thomas N. Kipf et al., "Semi-Supervised Classification with Graph Convolutional Networks", Feb. 22, 2017, 14 pages, arXiv:1609.02907v4.

M. Z. Naser et al., "Insights into Performance Fitness and Error Metrics for Machine Learning", May 17, 2020, 25 pages, arXiv:2006.00887v1.

Kenneth O. Stanley et al., "Evolving Neural Networks through Augmenting Topologies", Jun. 2002, pp. 99-127, Evolutionary Computation, vol. 10, No. 2.

Mingxing Tan et al., "EfficientNet: Rethinking Model Scaling for Convolutional Neural Networks", May 24, 2019, pp. 6105-6114, Int'l Conference on Machine Learning, PMLR.

Jack Turner et al., "BlockSwap: Fisher-guided Block Substitution for Network Compression on a Budget", Jan. 23, 2020, 15 pages, arXiv:1906.04113v2.

Jesper E. Van Engelen et al., "A survey on semi-supervised learning", Nov. 15, 20219, pp. 373-440, Machine Learning, vol. 109, No. 2.

Barret Zoph et al., "Neural Architecture Search with Reinforcement Learning", Feb. 15, 2017, 16 pages, arXiv:1611.01578v2.

United States Patent and Trademark Office, "Non-Final Office Action," issued in connection with U.S. Appl. No. 17/505,568, dated May 9, 2024, 32 pages.

United States Patent and Trademark Office, "Notice of Allowance and Fee(s) Due," issued in connection with U.S. Appl. No. 17/505,568, dated Oct. 30, 2024, 8 pages.

United States Patent and Trademark Office, "Notice of Allowance and Fee(s) Due," issued in connection with U.S. Appl. No. 17/505,568, dated Sep. 16, 2024, 8 pages.

United States Patent and Trademark Office, "Non-Final Office Action," issued in connection with U.S. Appl. No. 17/506,161, dated Jan. 30, 2025, 34 pages.

United States Patent and Trademark Office, "Notice of Allowance and Fee(s) Due," issued in connection with U.S. Appl. No. 17/505,568, dated Mar. 26, 2025, 9 pages.

United States Patent and Trademark Office, "Corrected Notice of Allowability," issued in connection with U.S. Appl. No. 17/505,568, dated Apr. 2, 2025, 2 pages.

United States Patent and Trademark Office, "Notice of Allowability," issued in connection with U.S. Appl. No. 17/504,996, dated Apr. 28, 2025, 2 pages.

United States Patent and Trademark Office, "Non-Final Office Action," issued in connection with U.S. Appl. No. 17/497,736 dated May 7, 2025, 36 pages.

United States Patent and Trademark Office, "Notice of Allowance and Fee(s) Due," issued in connection with U.S. Appl. No. 17/506,161, dated May 19, 2025, 5 pages.

* cited by examiner

HARDWARE-AWARE MACHINE LEARNING MODEL SEARCH MECHANISMS

BACKGROUND

Machine learning (ML) is the study of computer algorithms that improve automatically through experience and by the use of data. Performing machine learning involves creating a statistical model (or simply a "model"), which is configured to process data to make predictions and/or inferences. ML algorithms build models using sample data (referred to as "training data") and/or based on past experience in order to make predictions or decisions without being explicitly programmed to do so. The efficiency of an ML model, in terms of resource consumption, speed, accuracy, and other performance metrics, are based in part on the number and type of model parameters and/or hyperparameters used for the ML model. Changes to model parameters and/or hyperparameters can greatly impact the performance of a given ML model. In particular, reducing the number of parameters may decrease the accuracy of a model, but may allow the model to run faster and use less memory than it would with a larger number of parameters.

ML model design is a lengthy process that involves a highly iterative cycle of training and validation to tune the structure, parameters, and/or hyperparameters of a given ML model. The training and validation can be especially time consuming and resource intensive for larger ML architectures such as deep neural networks (DNNs) and the like. Conventional ML design techniques may also require relatively large amounts of computational resources beyond the reach of many users. Furthermore, in many cases these ML models (e.g., DNNs) are not particularly optimized for inference across different hardware platforms (e.g., different central processing units (CPUs), graphics processing units (GPUs), mobile devices, Internet of Things (IoT) devices, etc.).

Instead of manually designing an ML model, Neural Architecture Search (NAS) algorithms can be used to automatically discover an ideal ML model for a particular task (see e.g., Abdelfattah et al., "Zero-Cost Proxies for Lightweight NAS." ArXiv abs/2101.08134 (20 Jan. 2021) ("[Abdelfattah]")). NAS is a process of automating architecture engineering. However, NAS can also be time consuming and computationally intensive. Typically, using NAS can take many hours or days to fully train a single neural network (see [Abdelfattah]).

Additionally, existing NAS solutions begin with a specific problem domain (e.g., computer vision, natural language processing, etc.), specific task (e.g., question answering, image recognition, etc.), and a specific dataset that they attempt to solve by finding an optimal ML architecture. However, this restricts the set of possible candidates for an optimal ML architecture to that specific problem, and the discovered ML model may not perform well on another similar task (e.g., text classification, natural language inference) or dataset. In these ways, existing NAS solutions are unable to find ML models that are optimal for more than one problem domain, task, or dataset. The existing NAS solutions find ML models that are specific for a particular task and dataset, and not generalizable. ML models that are not generalizable have many disadvantages. For example, if the inference data is different from the training dataset, the accuracy of the network will drop considerably. Additionally, if an ML model is domain/task-specific, that ML model must run the entire search process again even for a very similar task. This process is time consuming and computationally resource hungry.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
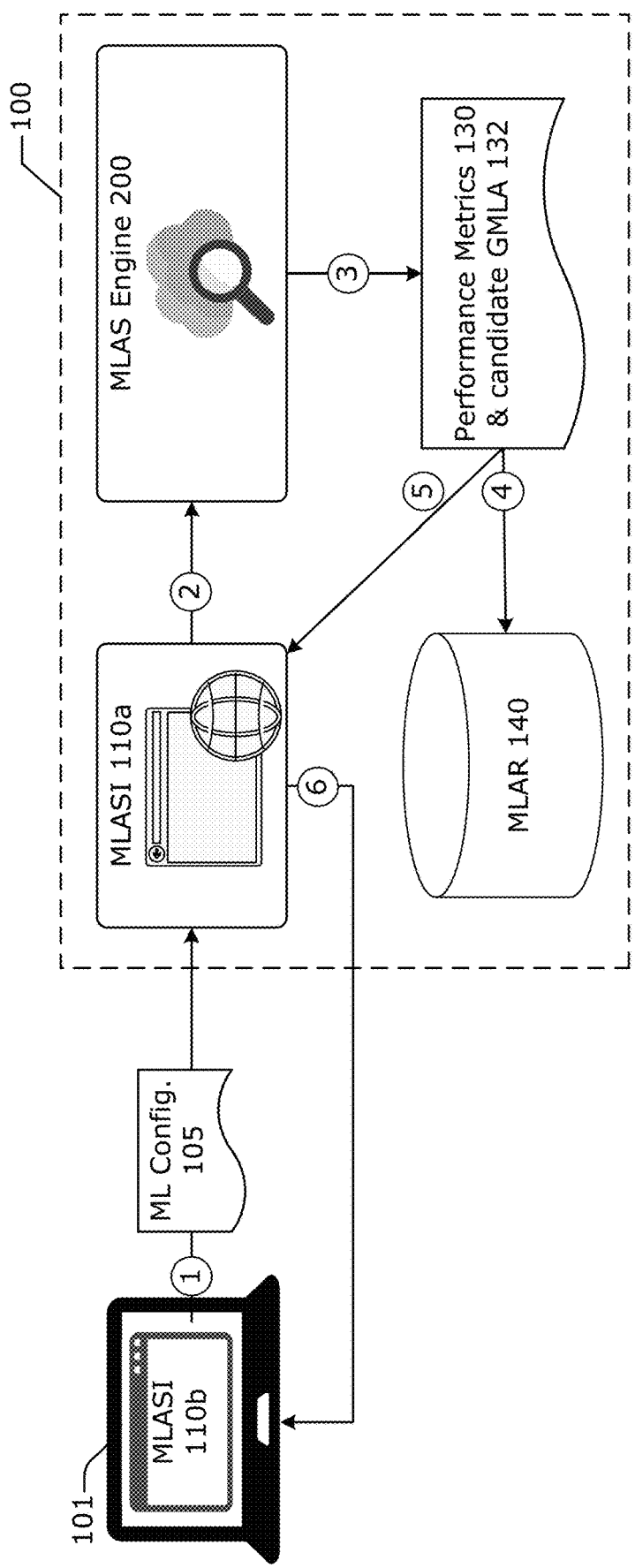
FIG. 1 depicts an overview of a machine learning (ML) architecture search system according to various embodiments.

The present disclosure is related to techniques for optimizing artificial intelligence (AI) and/or machine learning (ML) models to reduce resource consumption while improving AI/ML model performance. In particular, the present disclosure provides a ML architecture search framework that involves generalized and/or hardware (HW)-aware ML architectures.

AI/ML researchers are continually pushing the state-of-the-art by creating new ML models and algorithms (e.g., including DNNs) for different application domains (e.g., computer vision, language translation, etc.). In many cases, the ML models are created and evaluated on the HW platform available to the researcher at the time (e.g., a desktop computer with a standard consumer-based platform and/or a graphics processing unit (GPU)). Furthermore, researchers may only consider a narrow set of performance metrics (e.g., accuracy) when evaluating the ML model. Therefore, the ML model is inherently optimized for the HW platform available to the researcher at the time of researching and the particular metrics researched. Users trying to solve the same problem for which the ML model was designed may only have access to different HW platforms than those used by AI/ML researchers, or may have a particular HW platform in mind for deployment of a particular ML model. Furthermore, some users may be interested in different and/or multiple performance metrics (e.g., accuracy, latency, power consumption, etc.). The performance of the ML model provided by the researcher is then suboptimal for these users.

However, optimizing an ML model for individual HW platforms and specific performance metrics is a very time-consuming effort, which requires highly specialized knowledge. This type of optimization is typically done manually with a great deal of in-depth understanding of the HW platform since certain characteristics of the HW platform (e.g., clock speed, number of processor cores, amount of cache memory, etc.) will affect the optimization process. The optimization process is also affected by the characteristics of the input data to the ML model (e.g., batch size, image size, number of epochs/iterations, etc.). Finally, any change to the performance metrics (e.g., going from latency to power consumption), input data characteristics (e.g., increasing the batch size), HW characteristics (e.g., increasing the number of processor cores) or HW platform (e.g., going from a GPU to CPU) would require starting this expensive optimization process again.

The present disclosure provides an ML architecture search system that discovers ML architectures that generalizes well across multiple problem domains, tasks, and/or datasets. The ML architecture search system accepts the list of tasks and corresponding datasets as inputs, along with an optional relevancy score/weight for each item in the input. In some implementations, the ML architecture search system allows custom or proprietary datasets to be used in addition to, or alternative to publicly available datasets as possible inputs thereby increasing overall the flexibility to the end user. Additionally or alternatively, the end-user may specify multiple AI/ML tasks/domains, and allows the end-user to weigh the importance of the specified AI/ML tasks/domains. Additionally, a combined performance metric(s) (e.g., accuracy, etc.) is generated that quantifies the performance of the network across all the chosen tasks and datasets. The system then performs a multi-objective ML architecture search with the combined performance metric(s), along with HW specific performance metrics (e.g., latency, power, FLOPS, etc.) as the main objectives.

The ML architecture search system discussed herein is the first holistic DNN search solution that aims to generalize HW aware NAS solutions across multiple tasks, datasets and problem domains. As mentioned previously, the process of finding an optimal ML model for individual tasks and for individual HW platforms is an expensive process in terms of in terms of computation resource, memory/storage resource, and/or power consumption. The ML architecture search system discussed herein finds ML architectures that are generalizable to multiple tasks, domains, and datasets, thereby reducing the amount of resources and time required to find optimal ML architectures for different tasks, domains, and datasets and/or optimized for a specified HW platform.

1. Generalized Machine Learning (ML) Architecture Search Framework 1.1. System Overview FIG. 1 shows the main components and interactions of an ML architecture search (MLAS) system 100. MLAS system 100 provides a holistic and comprehensive framework for automatically and efficiently finding ML architectures, which are optimized to one or more specified performance metrics and/or HW platforms. The MLAS system 100 is applicable to multiple AI/ML domains (e.g., computer vision, natural language processing (NLP), recommendation, speech recognition, reinforcement learning, etc.) and/or AI/ML tasks (e.g., image recognition, semantic segmentation, language translation, language modeling, recommendation) and allows for intuitive specification of the AI/ML task(s) and/or domain(s) for which a user wants optimized ML architectures. The MLAS system 100 includes an MLAS interface (MLASI) 110a, an MLAS engine 200, performance metrics 130, and an ML architecture repository (MLAR) 140. Operation of the system 100 may be as follows.

At step 1, a client device 101 provides an ML configuration (config) 105 to the MLASI 110a. In FIG. 1, the client device 101 is shown as a laptop computer, however, the client device 101 may be any other type of client or user device such as those discussed herein. To interact with the MLASI 110a, the client device 101 operates an MLASI client application (app) 110b (hereinafter referred to as "MLASI 110b"), which may be a suitable client such as web browser, a desktop app, mobile app, a web app, and/or other like element that is configured to operate with the MLASI 110a via a suitable communication protocol (e.g., hypertext transfer protocol (HTTP) (or variants thereof), Message Queue Telemetry Transport (MQTT), Real Time Streaming Protocol (RTSP), and/or the like). The MLASI 110a allows a user of the client device 101 to manage (or specify) how the MLAS system 100 is to search for an optimal ML architecture.

For purposes of the present disclosure, the term "ML architecture" may refer to a particular ML model having a particular set of ML parameters and/or such an ML model configured to be operated on a particular HW platform. Here, the set of ML parameters may refer to "model parameters" (also referred to simply as "parameters") and/or "hyperparameters." Model parameters are parameters derived via training, whereas hyperparameters are parameters whose values are used to control aspects of the learning process and usually have to be set before running an ML model (e.g., weights, etc.). Additionally, for purposes of the present disclosure, hyperparameters may be classified as architectural hyperparameters or training hyperparameters. Architectural hyperparameters are hyperparameters that are related to architectural aspects of an ML model such as, for example, the number of layers in a DNN, specific layer types in a DNN (e.g., convolutional layers, multilayer perception (MLP) layers, etc.), number of output channels, kernel size, and/or the like. Training hyperparameters are hyperparameters that control an ML model's training process such as, for example, number of epochs, learning rate, and the like. For purposes of the present disclosure, the term "ML parameter" as used herein may refer to model parameters, hyperparameters, or both model parameters and hyperparameters unless the context dictates otherwise.

Figure 3:
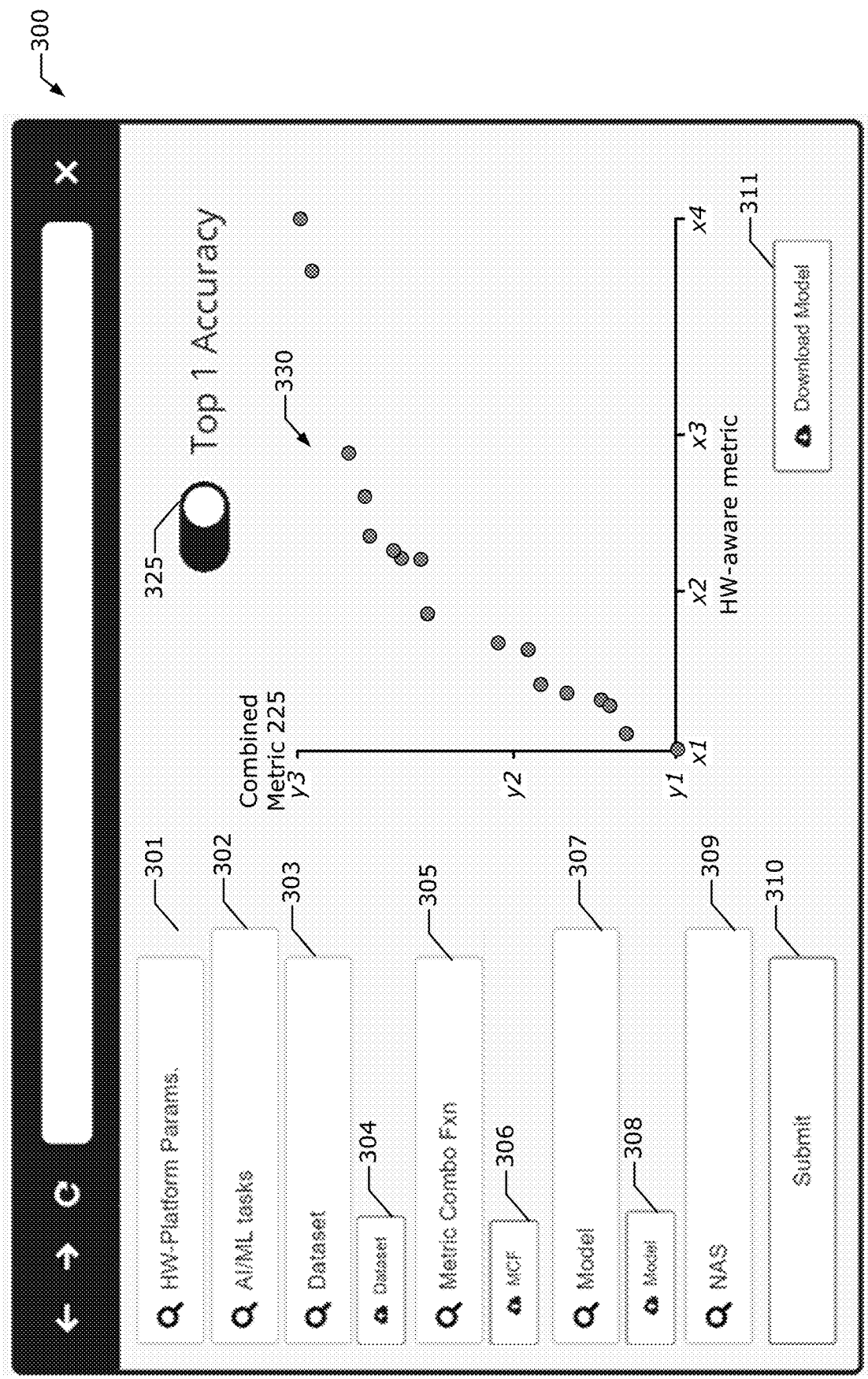
FIG. 3 depicts an example machine learning (ML) architecture search user interface according to various embodiments.

The MLASI 110a is a server-side app or the like that allows a user to provide inputs 105 to the system 100 using their MLASI 110b. For example, the MLASI 110a and MLASI 110b (collectively referred to as "MLASI 110") provides a platform or framework that allows ML model designers, developers, and/or other types of users to create, edit, and/or manipulate ML models and/or ML applications. The MLASI 110 comprises a graphical user interface (GUI) including various graphical elements/objects that allow users to add, update, and/or change various ML architecture search parameters and/or (pre-trained) supernet, and/or other like ML model aspects. The MLASI 110 also allows the user of the client device 101 to obtain (e.g., download) an optimal ML architecture/model discovered by the MLAS system 100. An example of such a GUI is shown in FIG. 3. In some implementations, the MLASI 110b may be a command line interface and/or a development environment that is the same or similar to a software development environment (SDE), an integrated development environment (IDE), a software development kit (SDK), a software development platform (SDP), etc., that are used for app development. In various implementations, the MLASI 110 may include a suitable file transfer mechanism or upload component that enables the user of the client device 101 to supply the ML config. 105 to the system 100. Additionally, the MLASI 110a includes application programming interfaces (APIs) to access the other subsystems of system 100, manages ML search parameter updates (e.g., new or updated ML config. 105), and calls any supported ML operations library (e.g., as indicated by the ML config. 105). Furthermore, the ML config. 105 may be an information object, file, electronic document, etc., in any suitable form or format such as, for example, a suitable mark-up language document (e.g., HyperText Markup Language (HTML), Extensible Markup Language (XML), AI Markup Language (AIML), JavaScript Object Notation (JSON), generalized markup language (GML), standardized GML (SGML), predictive model markup language (PMML), etc.), a model file format (e.g., Google® protocol buffer files (protobufs, .pb file extension), Keras (.h5 file extension), python (.pkl file extension), PyTorch models (.pt file extension), core ML model (.mlmodel file extension), etc.), a columnar file format (e.g., such as those discussed herein), a tabular file format (e.g., such as those discussed herein), and/or the like.

The ML config. 105 at least includes a set of search parameters. The set of search parameters include values, variables, objects, data, or other information including or indicating a desired one or more of AI/ML domain(s), AI/ML task(s) 205a (see e.g., FIG. 2), suitable dataset(s) 205b (see e.g., FIG. 2), supported libraries (e.g., PyTorch, TensorFlow, Apache™ MXNet, etc.), HW platform information (HPI), performance metrics (e.g., latency, accuracy, power consumption, etc.), ML parameters, and/or other like search parameters, information, and/or data. The set of search parameters may be in the form of a search query string, markup language document, and/or any other suitable form/format.

The AI/ML tasks 205a (see e.g., FIG. 2) may describe a desired problem to be solved and the AI/ML domain may describe a desired goal to be achieved. Examples of ML tasks include clustering, classification, regression, anomaly detection, data cleaning, automated ML (autoML), association rules learning, reinforcement learning, structured prediction, feature engineering, feature learning, online learning, supervised learning, semi-supervised learning (SSL), unsupervised learning, machine learned ranking (MLR), grammar induction, and/or the like. ML domains include, reasoning and problem solving, knowledge representation and/or ontology, automated planning, natural language processing (NLP), perception (e.g., computer vision, speech recognition, etc.), autonomous motion and manipulation (e.g., localization, robotic movement/travel, autonomous driving, etc.), social intelligence, reinforcement learning, etc. In some implementations, the ML config. 105 may include multiple AI/ML tasks 205a and user-specified weights 208d (see e.g., FIG. 2) or prioritizations of each specified AI/ML task 205a. For example, the ML config. 105 may include a first AI/ML task 205a with a largest weight 208d (or highest priority), a second AI/ML task 205a with a next largest weight 208d (or next highest priority), and so forth until a N-th AI/ML task 205a (where N is a number) with a smallest weight 208d (or lowest priority). Additional aspects of the weights 208d are discussed infra with respect to FIG. 2.

The ML config. 105 can also include an appropriately formatted dataset 205b (or a reference to such a dataset 205b). Here, an appropriately formatted dataset 205b refers to a dataset that corresponds to a specific ML architecture, a specified AI/ML task, and/or AI/ML domain. For example, a dataset that 205b would be used for the NLP domain would likely be different than a dataset 205b used for the computer vision domain. The dataset(s) 205b (see e.g., FIG. 2) is/are collections of data, which may include one or more database tables, electronic documents, files, and/or other data structures. The dataset(s) 205b may be in any suitable format such as a columnar file format (e.g., Hierarchical Data Format (HDF) including HDF4, HDFS, etc.; Hadoop distributed file system (HDFS); Apache® Parquet; petastorm; etc.), a tabular format (e.g. comma separated values (csv), spreadsheet file formats (e.g., .xlsx, etc.), etc.), a data-serialization format (e.g., Apache® Parquet, ASN.1, Extensible Data Notation (EDN), Efficient XML Interchange (EXI), Google® Protobufs, Google® FlatBuffers, MessagePack, Ethereum® Recursive Length Prefix (RLP), XML, YAML, etc.), Attribute-Relation File Format (ARFF), and/or the like. Additionally or alternatively, the dataset(s) 205b may be specific to a particular type of AI/ML task 205a such as, for example, the Stanford Question Answering Dataset (SQuAD), a Wikipedia® corpus, and/or the Multi-Genre Natural Language Inference (MNLI) dataset for NLP tasks, the ImageNet and/or the Cityscapes datasets for the computer vision (CV) domain, the Modified National Institute of Standards and Technology (MNIST) database for image recognition tasks, and/or the like. Additionally or alternatively, the dataset(s) 205b may be custom set(s) of data gathered and/or prepared by the user of the client device 101.

Additionally, the ML config. 105 may include HPI. The HPI may include configuration, specifications, technical details, characteristics, and/or other aspects of a desired HW platform and/or individual HW components on which the user intends to deploy an ML model. In some implementations, the ML config. 105 may include a particular identifier (ID) or information for a specific HW platform (e.g., system model, brand or product line, model number, generation or version number, stock keeping unit (SKU), product line suffix, serial number, device ID, device name, product ID, etc.), which would then be used to obtain relevant information of that platform for the ML architecture search. In one example of these implementations, the ML config. 105 may specify a desired system or device such as "Dell® PowerEdge® R750 Rack Server", "Intel® Quark™ SE microcontroller C1000 platform", "Mobotix® M73", "Samsung® Galaxy® S21 Ultra 5G", or the like. Additionally or alternatively, the user can input or otherwise indicate a specific cloud computing platform/service (and optionally, available resources based on their cloud service subscription, account details, etc.) such as, for example, by specifying Google Cloud® Vertex AI, Amazon® SageMaker™, Microsoft® Azure Machine Learning, and/or the like.

Additionally or alternatively, similar IDs/information may be provided for individual HW components (e.g., processor(s), memory devices, chipset, sensor types, etc.) such as, for example, an ID/information for a specific processor, individual memory devices, individual storage devices, motherboard, baseboard, I/O devices, network card, etc. Additionally or alternatively, the ML config. 105 may include specifications of different HW devices or platforms such as, for example, processor specifications (e.g., number of cores or threads, clock frequency or clock rate (e.g., base clock rate and/or boosted clock rate), cache size, bus speed, memory bandwidth, thermal design power (TDP), etc.), memory device specifications (e.g., capacity, cell type, stick type, clock frequency, etc.), storage device specifications (e.g., read/write speeds, input/output operations per second (IOPS), storage capacity, memory cell type, etc.), and/or other like specifications such as lithography or semiconductor technology used to manufacture an integrated circuit, and/or the like.

Additionally or alternatively, a relatively large reference ML model (referred to herein as a "super-network" or "supernet") may be provided instead of, with, or in the ML config. 105 from which the system 100 is to discover or generate a smaller ML model (referred to herein as a "sub-network" or "subnet"). The supernet may contain an over-parameterized set of operations from which one or more subnets are selected during generation of optimal ML architectures. As an example, a supernet may be a relatively large and/or dense ML model that an end-user has developed, but is expensive to operate in terms of computation, storage, and/or power consumption. This supernet may include parameters and/or weights that do not significantly contribute to the prediction and/or inference determination, and these parameters and/or weights contribute to the supernet's overall computational complexity and density. Therefore, the supernet contains a smaller subnet that, when trained in isolation, can match the accuracy of the original ML model (supernet) when trained for the same number of iterations or epochs. In some implementations, the user-supplied supernet may be pre-trained, or the system 100 may train the supernet. In this example, the MLAS engine 200 will discover and/or generate generalized subnets from the provided supernet. This subnet may be better optimized for operation on a low-end device (e.g., embedded device, SoC, IoT device, etc.) while still performing as well as the provided supernet to a certain degree (e.g., within some margin of error and/or within some range of performance that is close to the performance metrics of the supernet).

At step 2, the MLASI 110a provides the ML config. 105 to the MLAS engine 200. The MLAS engine 200 is an engine, module, or other like collection of elements used to discover and/or generate generalized ML architectures (GM-LAs) 132. Finding GMLAs results in richer representations, which helps those ML architectures perform better for unseen distributions of data. The discovery and/or generation of the GMLAs is determined by the information specified by the ML config. 105, for example, the AI/ML tasks 205a and the dataset(s) 205b. The MLAS engine 200 uses the ML config. 105 to generate performance metrics 130 with a GMLA 132, and also provides the performance metrics 130 with the GMLA 132 to the client device 101 via the MLASI 110. The MLAS engine 200 determines which ML-specific datasets 205b are generalizable for specified AI/ML tasks 205a and specified performance metrics, and employs this information to generalize a user-supplied ML model and/or to generalize another existing ML model. Additional aspects of the MLAS engine 200 are discussed infra with respect to FIG. 2.

At step 3, the performance metrics 130 with GMLA 132 are produced by the MLAS engine 200, which are provided to the client device 101 via the MLASI 110 (steps 5 and 6) and stored in a suitable datastore such as MLAR 140 (step 4). An example of the performance metrics 130 displayed by the MLASI 110b is shown in FIG. 3. A GMLA 132 is an ML architecture that can be used for more than one AI/ML task 205a and/or for more than one type of dataset 205a. The performance metrics 130 include some form of measurement(s) of performance of the generated/discovered ML models/architectures. At least in some embodiments, the performance metrics 130 may be referred to as performance indicators, key performance indicators (KPIs), and/or the like. Examples of the performance metrics 130 are discussed infra in section 1.2.

In some implementations, the performance metrics 130 may indicate be in the form of Pareto front (or Pareto frontier) that includes a set of ML architectures that are Pareto efficient solutions. Pareto efficiency refers to a situation where no individual or preference criterion can be better off without making at least one individual or preference criterion worse off or without any loss thereof. Here, an ML architecture may be considered to be Pareto optimal if there is no alternative allocation, configuration, or arrangement of the ML architecture (e.g., ML parameters, model (e.g., DNN layer) configuration/arrangement, HW configuration, etc.) where performance improvements can be made to at least one aspect of the ML architecture without reducing performance of another aspect of the ML architecture. This Pareto optimality may be presented as a Pareto frontier (also referred to as a "Pareto front" or "Pareto set"), which is the set of all Pareto efficient solutions/allocations. The Pareto front may be shown graphically (see e.g., Pareto frontier 330 of FIG. 3).

The MLAR 140 stores the ML architectures and learned parameter values (e.g., weights) of the optimal ML architectures chosen for download via the MLASI 110b. Additionally or alternatively, the MLAR 140 stores other aspects related to the optimal ML architectures such as, for example, various parameters of the optimal ML architectures; search criteria used to discover the optimal ML architectures (e.g., specified AI/ML task, AI/ML domain, HPI, etc.); heuristics, constraints, and/or other relationships between the parameters of the optimal ML architectures; and/or other like data related to the optimal ML architectures. The MLAR 140 may be a suitable data storage device, database (DB) system and/or a cloud computing service comprising a network or other interconnection of computing systems (e.g., servers, storage devices, applications, etc., such as those discussed herein) that provides access to a pool of physical and/or virtual resources. The MLAR 140 may implement any suitable data storage system/structure such as, for example, a relational DB management system (DBMS), such as non-relational DBMS (e.g., NoSQL DB), and/or some other suitable storage system/structure.

Figure 2:
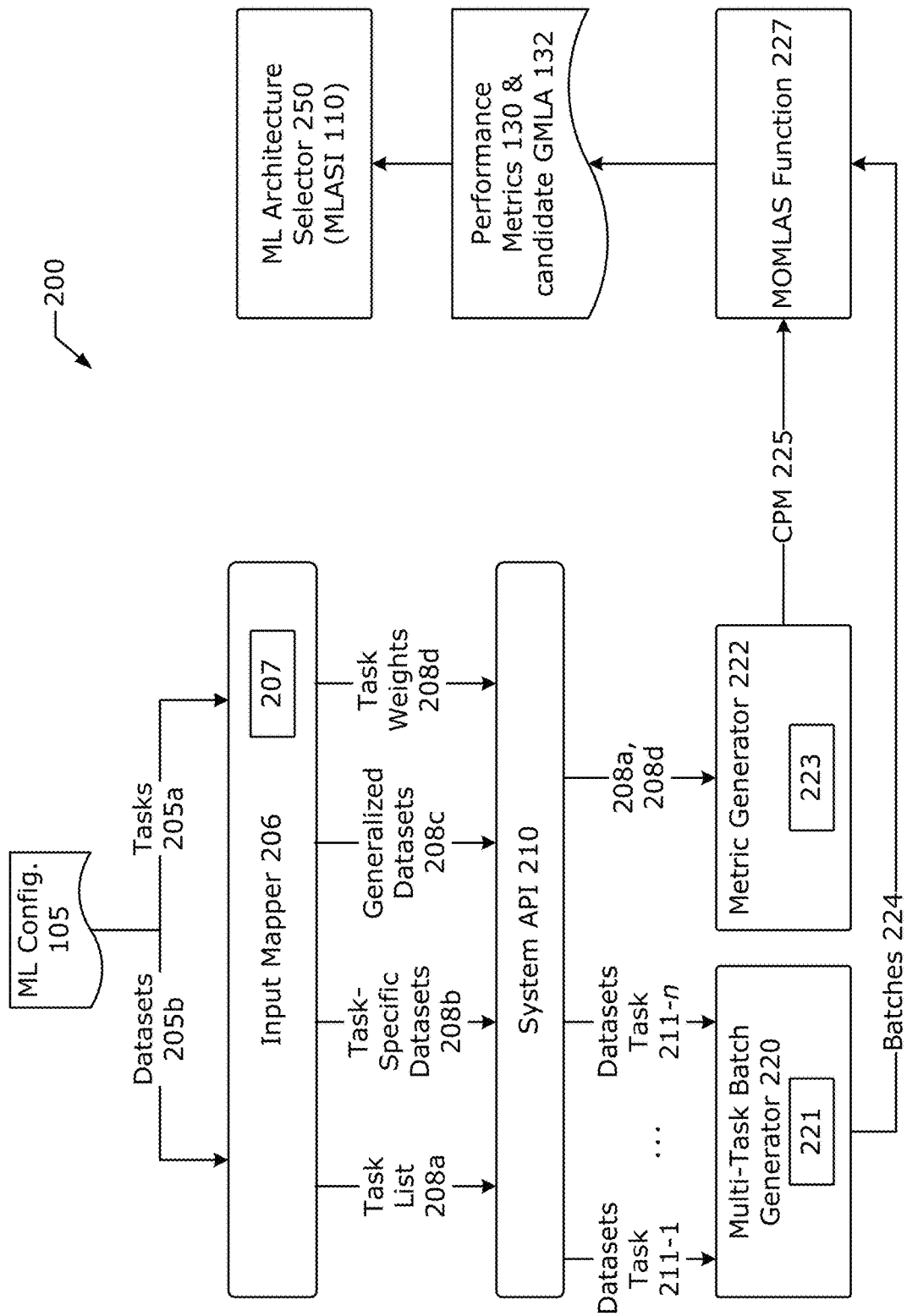
FIG. 2 depicts additional aspects of the ML architecture search system according to various embodiments.

FIG. 2 shows components of the MLAS engine 200 according to various embodiments. The MLAS engine 200 includes an input mapper 206, system API 210, multi-task batch generator 220, metric generator 222, multi-objective MLAS (MOMLAS) function 227, and ML architecture selector 250. The input mapper 206 initially verifies if provided tasks 208a are supported by the MLAS engine 200 and/or the MLAS system 100. The multi-task batch generator 220 then combines individual datasets 211 from each task 208a to create one or more common batches of data 224 (referred to herein as "batches 224") that feeds into the MOMLAS function 227. The MOMLAS function 227 performs a multi-objective search to generate a performance metrics 130 (e.g., a Pareto Frontier or some other graphical representation of the performance metrics 130) of candidate ML architectures (e.g., subnets) that generalize well across several chosen tasks 208a and datasets 211 (e.g., GMLAs 132). For the search objective, a combined performance metric (CPM) 225 is generated by the metric generator 222, which combines the performance metrics from the different tasks 208a into a single value based on the task weights 208d. A GMLA selector interface 250, which is part of the MLASI 110, presents the performance metrics 130 (e.g., Pareto frontier) with the GMLAs 132 to the end-user (e.g., user of client device 101) and allows the end-user to select a desired GMLA 132 for deployment. More details of the operation of the MLAS engine 200 are as follows.

The input mapper 206 accepts the dataset(s) 205b and task(s) 205a specified in the ML config. 105 and verifies if the tasks 205a are supported by the MLAS engine 200. If supported, the input mapper 206 produces a task list 208a (referred to intra as "task list 208a", "tasks 208a" or the like)

from the user-specified task(s) 205a, and then identifies task-specific datasets 208b and generalized datasets 208c from the task list 208a using a predefined or configurable set of rules and/or policies (collectively referred to as "ruleset 207"). In some implementations, the input mapper 206 maps the individual datasets 205b (or portions thereof) to the task-specific datasets 208b or the generalized datasets 208c. The task-specific datasets 208b are those which can be used only for a single task 208a, and generalized datasets 208c are those which can be used for multiple tasks 208a. For example, a Wikipedia® corpus is a generalized dataset 208c that is usually used for training NLP models, but can also be re-trained and/or fine-tuned for other tasks 208a. Furthermore, tasks 208a can be selected from different AI/ML domains as well. For example, both image recognition from the CV domain and language modeling from the NLP domain can be indicated in the ML config. 105. In this example, the task-specific datasets 208b may include the ImageNet dataset and the Wikipedia® corpus whereas the generalized datasets 208c may include the conceptual captioning dataset (used for text captioning) as it encompasses both CV and NLP domains.

In some implementations, the ruleset(s) 207 comprise documents, program code, and/or data structures that define (within various levels of granularity) set(s) of rules that govern the behavior of the input mapper 206 when mapping dataset(s) 205b to task-specific datasets 208b or generalized datasets 208c. For example, one or more of the ruleset(s) 207 may dictate how a particular dataset 205b or a particular type of data should be interpreted and/or if it's possible to be used with other types of AI/ML tasks 205a. In some implementations, the ruleset(s) 207 include definitions of define or otherwise indicate how individual fields, records, data objects, data elements, data sequences, etc., of the datasets 205b should be mapped, modified, joined, filtered, aggregated, rearranged, etc., to produce the final desired output (e.g., a set of task-specific datasets 208b and/or a set of generalized datasets 208c).

Furthermore, the input mapper 206 may produce weights 208d from the input ML config. 105 (also referred to as task-specific weights 208d), which are relevance and/or preferences for each task 208a of the listed tasks 208a. Here, the task-specific weights 208d indicate which task 208a is most important for a particular use case. For example, one task-specific weight 208d may indicate that a first task 208a is a highest priority for a first use case, but is a lowest priority for a second use case, and that a second task 208a is a highest priority for the second use case, but is a lowest priority for the first use case. If no weights 208d are specified, then the MLAS engine 200 may default to an identity value or the like, which indicates that all tasks 208a should be weighted equally.

The task list 208a, the task-specific datasets 208b, the generalized datasets 208c, and the task-specific weights 208d (if any) are passed to the system API 210. The system API 210 groups the datasets 208b, 208c according to each task in the task list 208a, producing individual datasets 211 for respective tasks that are provided to the multi-task batch generator 220. In the example of FIG. 2, the system API 210 grouped the datasets 208b, 208c (or data from the datasets 208b, 208c) into a first dataset for a first task (e.g., dataset(s) task 211-1) to an n-th dataset (where n is a number) for an n-th task (e.g., dataset(s) task 211-n). The system API 210 also passes the task list 208a and the task-specific weights 208d (if any) to the metric generator 222. The system API 210 may send the task list 208a and the task-specific weights 208d (if any) to the metric generator 222 separately, or may combine the task list 208a and the task-specific weights 208d before sending them to the metric generator 222.

The multi-task batch generator 220 pre-processes the task-specific datasets 208b and the generalized datasets 208c from the input mapper 206. The multi-task batch generator 220 applies different pre-processing techniques for selected input datasets 211 based on predefined and/or configured ruleset(s) 221. Here, the multi-task batch generator 220 uses the ruleset(s) 221 to translate, transcode, transform, or otherwise convert the datasets 211 into a format that is readable or otherwise consumable by the MOMLAS function 227. For example, the ruleset(s) 221 may define or otherwise indicate how individual fields, records, data objects, data elements, data sequences, etc., of the datasets 211 are mapped, modified, joined, filtered, aggregated, rearranged, etc., to produce the final desired output (e.g., data batches 224). In some implementations, the ruleset(s) 221 may include transformation language and/or a template language code/documents (e.g., eXtensible Stylesheet Language Transformations (XSLT), Template Attribute Language (TAL), CheetahTemplate, Django template language, and/or the like) that define or otherwise how the translation, transcoding, transformation, conversion, etc., is to take place. After the preprocessing and/or conversion, the multi-task batch generator 220 feeds batches of data (batches 224) to the MOMLAS function 227.

The metric generator 222 accepts the list of specified tasks 208a along with the weights 208d (if any) for each task 208a, and chooses a best or optimal metric for each task 208a using a predefined or configured ruleset(s) 223. Here, the ruleset(s) 223 indicate or define a mapping of tasks 208a to optimal metrics, and/or may define some other manner in which to select an optimal metric for a particular task 208a based on the various information provided in the ML config. 105. For example, the ruleset(s) 223 may indicate one or more proxy functions to use to estimate performance metrics for one or more tasks 208a, or may indicate how to measure actual performance metrics of individual tasks 208a. In one example, if the user selects, via the MLASI 110, machine translation as the AI/ML task 205a, 208a, the metric generator 222 may select 'BLEU score' as an optimal performance metric for the machine translation task 205a. In another example, if the user selects, via the MLASI 110, question answering as the AI/ML task 205a, 208a, the metric generator 222 may select F1 score as an optimal performance metric for the question answering task 205a, 208a. In yet another example, if the user selects, via the MLASI 110, object recognition as the AI/ML task 205a, 208a, the metric generator 222 may select Top-1 accuracy as an optimal performance metric for the object recognition task 208a. The metric generator 222 selects the performance metrics and how to combine the selected performance metrics into the CPM 225, and the computation of the selected performance metrics happens during an evolutionary search process (Eg, MOMLAS function 227 discussed infra).

After the optimal performance metrics are selected for each task 208a, the metric generator 222 generates a CPM 225. The CPM 225 is a combination of the metrics across all selected tasks 208a and selected datasets 211. The selected performance metrics may be combined in various ways. In one example, a weighted average of all the individual metrics selected for each task 205a, 208a may be used as the CPM 225. In this example, weighted average may be based on the task weights 208d of each task 208a. In another example, a statistical formula may be used to determine the CPM 225 such as a median, mean, maximum, etc., of the metrics selected for each task 208a. In this example, any of the statistical formulas or functions (or any combination thereof) used to calculate the performance metrics discussed herein and/or as those discussed in [Maser] may be used to calculate the CPM 225. Additionally or alternatively, an ML model such as an ML classifier or ML predictor could be used to predict the CPM 225 from the metrics selected for each task 208a. Additionally or alternatively, the user may provide a custom function or formula for calculating the CPM 225. Here, the custom function may be provided in the ML config. 105. The metric generator 222 provides the CPM 225 to the MOMLAS function 227.

The MOMLAS function 227 uses the batches 224 and the CPM 225 to perform a multi-objective MLAS to find one or more optimal ML architectures. In some implementations, the MOMLAS function 227 uses one or more optimizers to perform the multi-objective MLAS. The one or more optimizers may be based on one or more objective functions or multi-objective function(s), which includes an optimization problem involving more than one objective function, which are to be either minimized or maximized. A multi-objective optimization model may be defined that comprises one or more decision variables, objectives (the measures to be optimized), and constraints. The decision variables are variables that represent decisions to be made, and the objectives are the measures to be optimized. The constraints define restrictions on feasible solutions (including all optimal solutions) that must be satisfied, and/or restrictions on the values the decision variables may hold. One example of the decision variables includes network/ML architectures in the conetext of NAS. The objective functions indicate how much each of their decision variables contributes to the objectives to be optimized. The multi-objective optimization model may also define one or more coefficients corresponding to one or more of the decision variables. The coefficients indicate the contribution of the corresponding decision variable to the value of the objective function. The optimal solutions in multi-objective optimization can be defined from a mathematical concept of partial ordering. In the parlance of multi-objective optimization, the term domination is used for this purpose. A first solution is said to dominate a second solution if both of the following conditions are true: (1) the first solution is no worse than the second solution in all objectives, and (2) the first solution is strictly better than the second solution in at least one objective. For a given set of solutions, a pair-wise comparison can be made using a graphical representation and a determination as to whether one point in the graph dominates the other can be established. All points that are not dominated by any other member of the set are called "non-dominated points" or "non-dominated solutions". The Pareto frontier comprises a set of non-dominated points in such a graphical representation.

In embodiments, the MOMLAS function 227 involves solving the multi-objective function to optimize a number of objectives simultaneously, where the objectives of the multi-objective function include the CPM 225 and one or more platform-based performance metrics such as latency, FLOPs, power consumption, and/or other like metrics such as those discussed herein. In some implementations, the platform-based performance metrics may be specified in the ML config. 105, or may derived from the HW platform specified by the ML config. 105. Additionally, the task weights 208d may be used as coefficients in the multi-objective function to weight each task 208a accordingly.

In some implementations, the MOMLAS function 227 (also referred to as a "multi-objective HW-aware NAS function 227" or the like) may be, or may implement, a multi-objective evolutionary algorithm (MOEA) such as those discussed in Huang et al., "Survey on Multi-Objective Evolutionary Algorithms", IOP Conf. Series: J. of Physics: Conf. Series, vol. 1288, No. 1, p. 012057 (1 Aug. 2019) ("[Huang]") and Deb, "Multi-Objective Optimization Using Evolutionary Algorithms", Indian Institute of Technology-Kanpur, Dept. of Mechanical Engineering, Kanpur, India, KanGAL Report No. 2011003 (10 Feb. 2011), available at: https://www.egr.msu.edu/~kdeb/papers/k2011003.pdf ("[Deb1]"), the contents of each of which are hereby incorporated by reference in their entireties (see also Eiben et al., "Introduction to evolutionary computing", $2^{nd}$ Ed., Springer, Berlin (2015) ("[Eiben]"), the contents of which is hereby incorporated by reference in its entirety).

Additionally or alternatively, the MOMLAS function 227 employs the enhanced evolutionary algorithm search using diversity preservation (see e.g., Deb et al., "A Fast and Elitist Multiobjective Genetic Algorithm: NSGA-II", IEEE Transactions on Evolutionary Computation, vol. 6, no. 2, (April 2002) ("[Deb2]") and Igel et al., "Covariance Matrix Adaptation for Multi-objective Optimization", Evolutionary Computation, vol. 15, no. 1, pp. 1-28 (1 Mar. 2007) ("[Igel]"), the contents of each of which are hereby incorporated by reference in their entireties). Additionally or alternatively, the MOMLAS function 227 employs an enhanced evolutionary algorithm search using non-functional architecture avoidance (see e.g., Stanley et al., "Evolving Neural Networks Through Augmented Topologies", Evolutionary Computation, vol. 10, no. 2, pp. 99-127 (10 Jun. 2002) ("[Stanley]"), the contents of which is hereby incorporated by reference in its entirety).

Additionally or alternatively, the MOMLAS function 227 may be, or may implement Strength Pareto Evolutionary Algorithm 2 (SPEA-2) (see e.g., Zitzler et al., "SPEA2: Improving the Performance of the Strength Pareto Evolutionary Algorithm," Technical Report 103, Computer Engineering and Communication Networks Lab (TIK), Swiss Federal Institute of Technology (ETH) Zurich, C H, Tik-Report 103 (May 2001), the contents of which is hereby incorporated by reference in its entirety). Additionally or alternatively, the MOMLAS function 227 may be, or may implement a non-dominated sorting genetic algorithm-II (NSGA-II) (see e.g., [Deb2] and Lu et al., "NSGA-Net: Neural Architecture Search using Multi-Objective Genetic Algorithm", arXiv:1810.03522v2 [cs.CV] (18 Apr. 2019) ("[Lu]"), the contents of which is hereby incorporated by reference in its entirety), and/or some other search algorithm. In some implementations, the enhanced EA mentioned previously may be an enhanced version of NSGA-II ("eNSGA-II") as discussed in co-pending U.S. application Ser. No. 17/505,568, the contents of which is hereby incorporated by reference in its entirety.

Additionally or alternatively, the MOMLAS function 227 may implement some other suitable NAS algorithm such as, for example, those discussed in Liu et al., "DARTS: Differentiable Architecture Search", arXiv:1806.09055v2 [cs.LG] (23 Apr. 2019) ("[Liu]"), Cai et al., Once-for-All: Train One Network and Specialize it for Efficient Deployment", arXiv: 1908.09791v5 [cs.LG] (29 Apr. 2020) ("[Cai1]"), and Cai et al., "ProxylessNAS: Direct Neural Architecture Search on Target Task and Hardware", arXiv:1812.00332v2 [cs.LG] (23 Feb. 2019) ("[Cai2]"), Wang et al., "HAT: Hardware-Aware Transformers for Efficient Natural Language Processing", arXiv:2005.14187v1 [cs.CL] (28 May 2020) ("[Wang]"), Wang et al., "Multi-Objective Neural Architecture Search Based on Diverse Structures and Adaptive Recommendation", arXiv:2007.02749v2 [cs.CV] (13 Aug.

2020) ("[Wang2]"), Guerrero-Viu et al., "Bag of Baselines for Multi-objective Joint Neural Architecture Search and Hyperparameter Optimization", arXiv:2105.01015v1 [cs.LG] (3 May 2021) ("[Guerrero-Viu]"), the contents of each of which are hereby incorporated by reference in their entireties.

In various embodiments, the MLAS algorithm used by the MOMLAS function 227 is modular and flexible, where different search functions, including new state-of the art algorithms, can be easily swapped in and out of the MLAS engine 200. In this way, different search functions may be used that are better suited for a particular ML architecture, which can save computational resources and/or provide efficiencies in how those resources are used. In some implementations, an end user (e.g., user of client device 101) may specify in the ML config. 105 the particular search function/ NAS algorithm they wish to use.

The MOMLAS function 227 discovers and/or generates candidate GMLAs 132 and also generates performance metrics 130 of the candidate GMLAs 132 that are optimal for the specified HW-platform. In some implementations, the MOMLAS function 227 provides a Pareto frontier of the candidate GMLAs 132 that are optimal for the specified HW-platform. In one example (as is shown by FIG. 3), the Pareto frontier of the candidate GMLAs 132 may be plotted in a graph where the CPM 225 is on one axis and an HW-aware constraint on the other axis.

In some implementations, the MOMLAS function 227 evaluates performance metrics 130 of the candidate GMLAs 132. The MOMLAS function 227 may compute actual performance metrics or may use proxy function(s) to approximate the performance metrics. In some implementations, the user may select whether to use actual performance metrics or one or more specific proxy function(s). The actual performance metrics may be measured and/or collected using actual data by, for example, training or otherwise operating the candidate GMLAs 132 using a predefined dataset and compute the performance metric(s).

The proxy function(s) include any function that takes one or more variables, ML parameters, data, and/or the like as inputs, and produces an output that is a replacement, substitute, stand-in, surrogate, or representation of the inputs. The proxy functions are used to approximate model performance for the candidate GMLAs 132. Examples of proxy function(s) that may be used include functions and/or data structures that map keys to values (e.g., associative arrays, mapping functions, dictionaries, hash tables, LUTs, linked lists, etc.), ML classifiers and/or ML regressors, parameter counting, computational throughput metrics, Jacobian covariance, saliency pruning, channel pruning, and heuristic and/or hyper-heuristic functions, and/or some other suitable proxy function or combinations thereof (see e.g., co-pending U.S. application Ser. No. 17/497,736, which is hereby incorporated by reference in its entirety). In some implementations, the proxy function(s) may be used to predict the performance metrics of the candidate GMLAs 132, and when a Pareto front is determined, the actual performance metrics can be measured for the candidate GMLAs 132 that lie along the Pareto front.

The output of the MOMLAS function 227 is provided to an ML architecture selector interface 250, which may be part of the MLASI 110. The ML architecture selector interface 250 presents the performance metrics 130 and the candidate GMLAs 132 that generalize well across all the selected tasks and datasets while being optimal in terms of performance. The user of the client device 101 can then select a desired one of the candidate GMLAs 132 for deployment.

In any of the above embodiments, the ruleset(s) 207, 221, and/or 223 may comprise documents, program code, and/or data structures that define (within various levels of granularity) set(s) of rules that govern the behavior of the input mapper 206, multi-task batch generator 220, metric generator 222, and/or other subsystems of the MLAS engine 200. Additionally or alternatively, the rulesets 207, 221, and/or 223 may be implemented using a suitable mapping function and/or any suitable function(s) and/or data structures that map attributes and/or keys to values such as, for example, associative arrays, mapping functions, dictionaries, hash tables, look-up tables (LUTs), linked lists, ML classifiers, heuristic and/or hyper-heuristic functions, and/or some other suitable function(s) or combinations thereof. Additionally or alternatively, any suitable programming languages, markup languages, schema languages, etc., may be used to define the rulesets 207, 221, and/or 223 and instantiate instances of those rulesets 207, 221, and/or 223. As examples, the ruleset(s) 207, 221, and/or 223 may be defined using HTML, XML, JSON, markdown, IFTTT ("If This Then That"), PADS markup language (PADS/ML), and/or some other suitable data format, such as those discussed herein. Additionally or alternatively, the documents or data structures of the ruleset(s) 207, 221, and/or 223 may include a "description," which is a collection of software modules, program code, logic blocks, parameters, rules, conditions, etc., that may be used by the input mapper 206, the multi-task batch generator 220, and/or the metric generator 223 to perform the mappings.

1.2. Performance Metrics

The performance metrics that may be measured and/or predicted by the metric generator 222 and/or the MOMLAS function 227 may be based on the particular AI/ML task(s) 205a, 208a and/or one or more other inputs/parameters of the ML config. 105. The performance metrics may include model-based metrics and platform-based metrics. The model-based metrics are metrics related to the performance of the model itself and/or without considering the underlying HW platform. The platform-based metrics are metrics related to the performance of the underlying HW platform when operating the ML model.

The model-based metrics may be based on the particular type of AI/ML model and/or the AI/ML domain. For example, regression-related metrics may be predicted for regression-based ML models. Examples of regression-related metrics include error value, mean error, mean absolute error (MAE), mean reciprocal rank (MRR), mean squared error (MSE), root MSE (RMSE), correlation coefficient (R), coefficient of determination ($R^2$), Golbraikh and Tropsha criterion, and/or other like regression-related metrics such as those discussed in Naser et al., "Insights into Performance Fitness and Error Metrics for Machine Learning", arXiv: 2006.00887v1 (17 May 2020) ("[Naser]"), which is hereby incorporated by reference in its entirety.

In another example, correlation-related metrics may be predicted for correlation-related metrics Examples of correlation-related metrics include accuracy, precision (also referred to as positive predictive value (PPV)), mean average precision (mAP), negative predictive value (NPV), recall (also referred to as true positive rate (TPR) or sensitivity), specificity (also referred to as true negative rate (TNR) or selectivity), false positive rate, false negative rate, F score (e.g., $F_1$ score, $F_2$ score, $F_\beta$ score, etc.), Matthews Correlation Coefficient (MCC), markedness, receiver operating characteristic (ROC), area under the ROC curve (AUC), distance score, and/or other like correlation-related metrics such as those discussed in [Naser].

Additional or alternative model-based metrics may also be predicted such as, for example, cumulative gain (CG), discounted CG (DCG), normalized DCG (NDCG), signal-to-noise ratio (SNR), peak SNR (PSNR), structural similarity (SSIM), Intersection over Union (IoU), perplexity, bilingual evaluation understudy (BLEU) score, inception score, Wasserstein metric, Fréchet inception distance (FID), string metric, edit distance, Levenshtein distance, Damerau-Levenshtein distance, number of evaluation instances (e.g., iterations, epochs, or episodes), learning rate (e.g., the speed at which the algorithm reaches (converges to) optimal weights), learning rate decay (or weight decay), number and/or type of computations, number and/or type of multiply and accumulates (MACs), number and/or type of multiply adds (MAdds) operations, and/or other like performance metrics related to the performance of the ML model.

Examples of the platform-based metrics include latency, response time, throughput (e.g., rate of processing work of a processor or platform/system), availability and/or reliability, power consumption (e.g., performance per Watt, etc.), transistor count, execution time (e.g., amount of time to obtain a prediction, inference, etc.), memory footprint, memory utilization, processor utilization, processor time, number of computations, instructions per second (IPS), floating point operations per second (FLOPS), and/or other like performance metrics related to the performance of the ML model and/or the underlying HW platform to be used to operate the ML model.

Additionally or alternatively, proxy metrics (e.g., a metric or attribute used as a stand-in or substitute for another metric or attribute) can be used for predicting the ML model performance. For any of the aforementioned performance metrics, the total, mean, and/or some other distribution of such metrics may be predicted and/or measured using any suitable data collection and/or measurement mechanism(s).

1.3. Example User Interfaces

FIG. 3 shows an example graphical user interface (GUI) 300 that may be used by a user to perform an ML architecture search according to various embodiments. The GUI 300 may correspond to the MLASI client application (app) 110*b* of FIG. 1. In this example, the GUI 300 includes various graphical objects 301-309 that enable the user to provide ML parameters to the system 100. The graphical object 301 is a text input box that allows the user to input and search for a particular HW platform on which they wish to operate the ML architecture. The graphical object 303 is a text input box that allows the user to input and search for one or more AI/ML tasks 205*a* to be included in the ML config. 105. The graphical object 303 is a text input box that allows the user to input and search for one or more datasets 205*b* to be included in the ML config. 105. The user may additionally or alternatively upload a dataset by selecting the graphical object (button) 304. The graphical object 305 is a text input box that allows the user to input and search for a particular combination metric function (MCF) to be used by the metric generator 222. The user may additionally or alternatively upload a custom MCF by selecting the graphical object (button) 306. The graphical object 307 is a text input box that allows the user to input and search for a particular ML model (e.g., supernet) to be included in the ML config. 105. The user may additionally or alternatively upload a custom ML model by selecting the graphical object (button) 308. The graphical object 309 is a text input box that allows the user to input and search for a particular NAS function to be used to perform the ML architecture search (e.g., by the MOMLAS function 227). In some implementations, the user may begin typing and the text input boxes 301, 302, 303, 305, 307, and 309 may be auto-populated based on each character that the user types. Additional or alternative graphical objects may be included to allow the user to select predefined ML parameters including, for example, a desired batch sizes (e.g., 16, 32, and so forth), number of processor cores (e.g., which may be dependent on the particular target platform the user selects), memory device(s) and/or memory size, specific performance metrics, a number format (numerics) including a particular representation (e.g., fixed-point formatting, "fp32" or "float32", Institute of Electrical and Electronics Engineers (IEEE) 754 floating point representation, an arbitrary-precision representation, and so forth), and/or other like parameters. The user may then submit the selected search parameters to the system 100 using the graphical object 310 (e.g., the submit button 306 in FIG. 3). Upon selecting the submit button 310, the MLASI 110*b* generates the ML config. 105 and submits it to the system 100.

After the user inputs the various search parameters, the system 100 finds candidate GMLAs 132 and displays them to the user via the GUI 300 who can then select and download the GMLAs 132 which best fits their needs using the graphical object (download button) 311. In this example, the GUI 300 displays a graph 330 indicating the Pareto frontier (referred to as "Pareto frontier 330") of the discovered candidate GMLAs 132. In this example, the Pareto frontier 330 is represented by the displayed points in the graph 330. Each point in the graph 330 may represent a respective candidate GMLA 132 that is downloadable by the user. Here, the user then can click on an individual point in the graph 330, and select the download button 311 to download the corresponding ML model.

Additionally, the GUI 300 includes a toggle graphical object 325 (also referred to as "top-1 object 325", "top-1 325", or the like) that allows the user to switch between views of only ML architectures having top-1 accuracy and all discovered/generated ML models. Top-1 accuracy refers to a level of ML model prediction accuracy where a model answer with the highest probability is the expected answer. Top-1 accuracy measures the proportion of examples for which the predicted label matches a single target label. Additionally or alternatively, the GUI 300 may include a GCE for viewing Top-5 accuracy of the ML models, which indicates whether any of an ML model's five highest probability answers match the expected answer. When the user selects the toggle graphical object 325, the number and position of the points in the graph 330 may change.

In one example use case, the system 100 is a tool or service provided by a distributed computing system such as a cloud computing service. These users of this service (e.g., users of client device 101) would use the tool to quickly and automatically find generalizable ML architectures that run efficiently on their existing HW platform, and satisfy accuracy requirements and/or other desired performance metrics, providing them with a great deal of value.

2. Artificial Intelligence And Machine Learning Aspects

Machine learning (ML) involves programming computing systems to optimize a performance criterion using example (training) data and/or past experience. ML refers to the use and development of computer systems that are able to learn and adapt without following explicit instructions, by using algorithms and/or statistical models to analyze and draw inferences from patterns in data. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure. Any of the ML techniques discussed herein may be utilized, in whole or in part, and variants and/or combinations thereof, for any of the example embodiments discussed herein.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used.

ML algorithms accept model parameters (or simply "parameters") and/or hyperparameters that can be used to control certain properties of the training process and the resulting model. Model parameters are parameters, values, characteristics, configuration variables, and/or properties that are learnt during training. Model parameters are usually required by a model when making predictions, and their values define the skill of the model on a particular problem. Hyperparameters at least in some embodiments are characteristics, properties, and/or parameters for an ML process that cannot be learnt during a training process. Hyperparameter are usually set before training takes place, and may be used in processes to help estimate model parameters.

ML techniques generally fall into the following main types of learning problem categories: supervised learning, unsupervised learning, and reinforcement learning. Supervised learning involves building models from a set of data that contains both the inputs and the desired outputs. Unsupervised learning is an ML task that aims to learn a function to describe a hidden structure from unlabeled data. Unsupervised learning involves building models from a set of data that contains only inputs and no desired output labels. Reinforcement learning (RL) is a goal-oriented learning technique where an RL agent aims to optimize a long-term objective by interacting with an environment. Some implementations of AI and ML use data and neural networks (NNs) in a way that mimics the working of a biological brain. An example of such an implementation is shown by FIG. 4.

Figure 4:
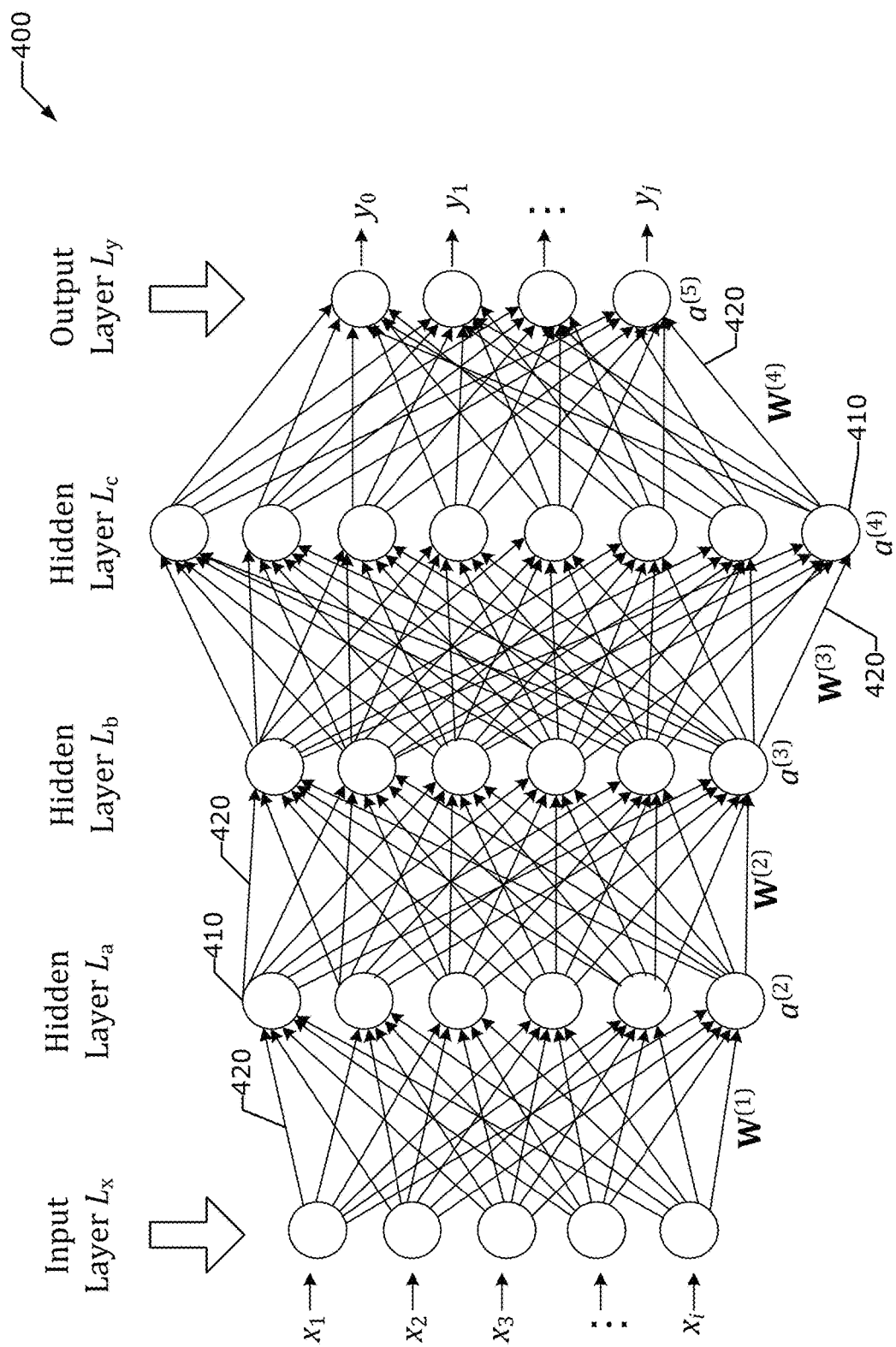
FIG. 4 depicts an example neural network (NN).

FIG. 4 illustrates an example NN 400, which may be suitable for use by one or more of the computing systems (or subsystems) of the various implementations discussed herein, implemented in part by a hardware accelerator, and/or the like. The NN 400 may be deep neural network (DNN) used as an artificial brain of a compute node or network of compute nodes to handle very large and complicated observation spaces. Additionally or alternatively, the NN 400 can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. NNs are usually used for supervised learning, but can be used for unsupervised learning and/or RL.

The NN 400 may encompass a variety of ML techniques where a collection of connected artificial neurons 410 that (loosely) model neurons in a biological brain that transmit signals to other neurons/nodes 410. The neurons 410 may also be referred to as nodes 410, processing elements (PEs) 410, or the like. The connections 420 (or edges 420) between the nodes 410 are (loosely) modeled on synapses of a biological brain and convey the signals between nodes 410. Note that not all neurons 410 and edges 420 are labeled in FIG. 4 for the sake of clarity.

Each neuron 410 has one or more inputs and produces an output, which can be sent to one or more other neurons 410 (the inputs and outputs may be referred to as "signals"). Inputs to the neurons 410 of the input layer $L_x$ can be feature values of a sample of external data (e.g., input variables $x_i$). The input variables $x_i$ can be set as a vector containing relevant data (e.g., observations, ML features, etc.). The inputs to hidden units 410 of the hidden layers $L_a$, $L_b$, and $L_c$ may be based on the outputs of other neurons 410. The outputs of the final output neurons 410 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 410 may have a threshold such that a signal is sent only if the aggregate signal crosses that threshold. A node 410 may include an activation function, which defines the output of that node 410 given an input or set of inputs. Additionally or alternatively, a node 410 may include a propagation function that computes the input to a neuron 410 from the outputs of its predecessor neurons 410 and their connections 420 as a weighted sum. A bias term can also be added to the result of the propagation function.

The NN 400 also includes connections 420, some of which provide the output of at least one neuron 410 as an input to at least another neuron 410. Each connection 420 may be assigned a weight that represents its relative importance. The weights may also be adjusted as learning proceeds. The weight increases or decreases the strength of the signal at a connection 420.

The neurons 410 can be aggregated or grouped into one or more layers L where different layers L may perform different transformations on their inputs. In FIG. 4, the NN 400 comprises an input layer $L_x$, one or more hidden layers $L_a$, $L_b$, and $L_c$, and an output layer $L_y$ (where a, b, c, x, and y may be numbers),where each layer L comprises one or more neurons 410. Signals travel from the first layer (e.g., the input layer $L_1$), to the last layer (e.g., the output layer $L_y$), possibly after traversing the hidden layers $L_a$, $L_b$, and $L_c$ multiple times. In FIG. 4, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 4, for simplicity of illustration, there are only three hidden layers $L_a$, $L_b$, and $L_c$ in the ANN 400, however, the ANN 400 may include many more (or fewer) hidden layers $L_a$, $L_b$, and $L_c$ than are shown.

3. Example Hardware and Software Configurations and Arrangements

Figure 5A:
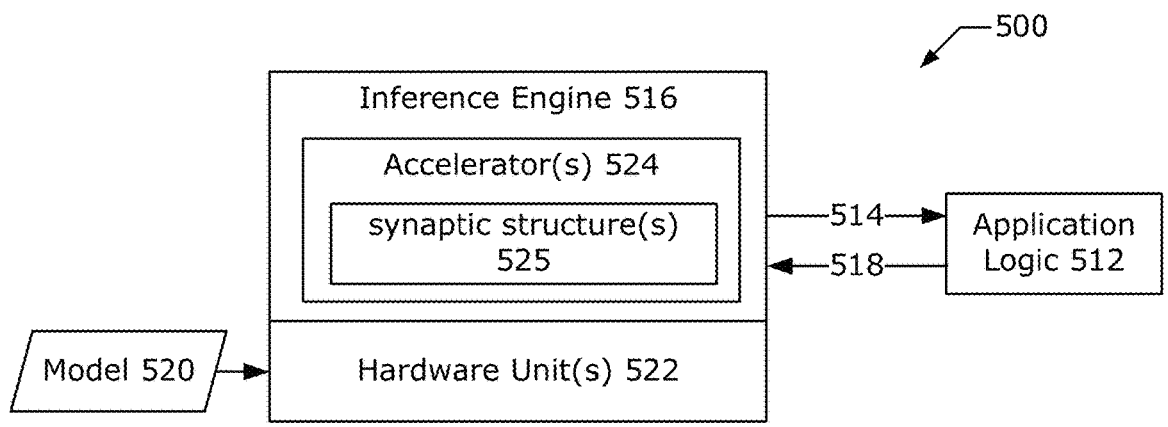
FIG. 5a illustrates an example accelerator architecture.

FIG. 5a is an example accelerator architecture 500 for according to various embodiments. The accelerator architecture 500 provides neural network (NN) functionality to application logic 512, and as such, may be referred to as a NN accelerator architecture 500, DNN accelerator architecture 500, and/or the like.

The application logic 512 may include application software and/or hardware components used to perform specification functions. The application logic 512 forwards data 514 to an inference engine 516. The inference engine 516 is a runtime element that delivers a unified application programming interface (API) that integrates a ANN (e.g., DNN(s) or the like) inference with the application logic 512 to provide a result 518 (or output) to the application logic 512.

To provide the inference, the inference engine 516 uses a model 520 that controls how the DNN inference is made on the data 514 to generate the result 518. Specifically, the model 520 includes a topology of layers of a NN. The topology includes an input layer that receives the data 514, an output layer that outputs the result 518, and one or more hidden layers between the input and output layers that provide processing between the data 14 and the result 518. The topology may be stored in a suitable information object, such as an extensible markup language (XML), JavaScript Object Notation (JSON), and/or other suitable data structure, file, and/or the like. The model 520 may also include weights and/or biases for results for any of the layers while processing the data 514 in the inference using the DNN.

The inference engine 516 may be implemented using and/or connected to hardware unit(s) 522. The inference engine 516 at least in some embodiments is an element that applies logical rules to a knowledge base to deduce new information. The knowledge base at least in some embodiments is any technology used to store complex structured and/or unstructured information used by a computing system (e.g., compute node 550 of FIG. 5). The knowledge base may include storage devices, repositories, database management systems, and/or other like elements.

Furthermore, the inference engine 516 includes one or more accelerators 524 that provide hardware acceleration for the DNN inference using one or more hardware units 522. The accelerator(s) 524 are software and/or hardware element(s) specifically tailored/designed as hardware acceleration for AI/ML applications and/or AI/ML tasks. The one or more accelerators 524 may include one or more processing element (PE) arrays and/or a multiply-and-accumulate (MAC) architecture in the form of a plurality of synaptic structures 525. The accelerator(s) 524 may correspond to the acceleration circuitry 564 of FIG. 5 described infra.

The hardware unit(s) 522 may include one or more processors and/or one or more programmable devices. As examples, the processors may include central processing units (CPUs), graphics processing units (GPUs), dedicated AI accelerator Application Specific Integrated Circuits (ASICs), vision processing units (VPUs), tensor processing units (TPUs) and/or Edge TPUs, Neural Compute Engine (NCE), Pixel Visual Core (PVC), photonic integrated circuit (PIC) or optical/photonic computing device, and/or the like. The programmable devices may include, for example, logic arrays, programmable logic devices (PLDs) such as complex PLDs (CPLDs), field-programmable gate arrays (FPGAs), programmable ASICs, programmable System-on-Chip (SoC), and the like. The processor(s) and/or programmable devices may correspond to processor circuitry 552 and/or acceleration circuitry 564 of FIG. 5.

Figure 5B:
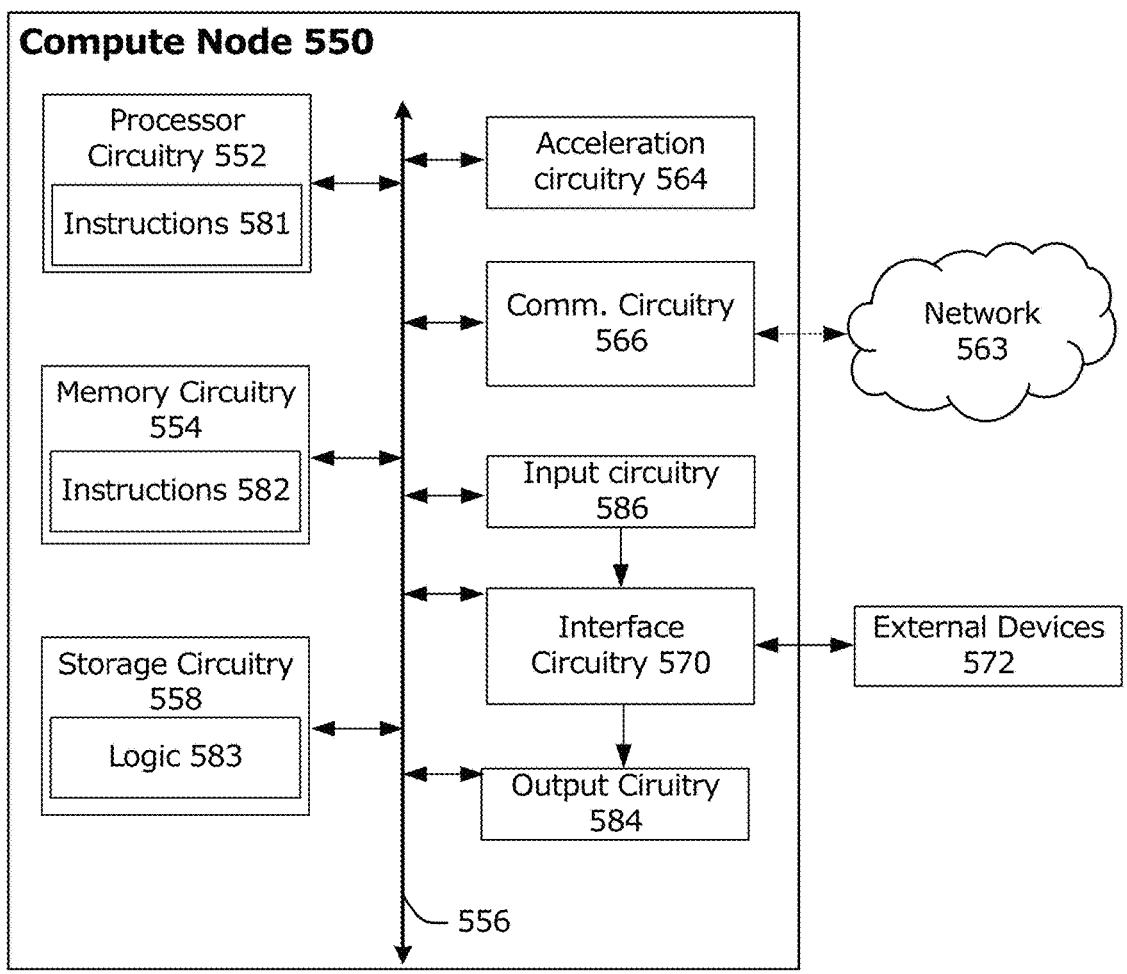
FIG. 5b illustrates an example components of a computing system.

FIG. 5b illustrates an example of components that may be present in a compute node 550 for implementing the techniques (e.g., operations, processes, methods, and methodologies) described herein. FIG. 5b provides a view of the components of node 550 when implemented as part of a computing device (e.g., as a mobile device, a base station, server computer, gateway, appliance, etc.). In some implementations, the compute node 550 may be an application server, edge server, cloud compute node, or other like device/system configured to operate the MLAS system 100 (or portions thereof). In one example, the compute node 550 may be an application server that operates the MLASI 110b, and another compute node 550 may be an edge or cloud compute node that operates the MLAS engine 200. Additionally or alternatively, the compute node 550 may be an application server, edge server, cloud compute node, or the like that operates some or all of the process 600 discussed previously. The compute node 550 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 550, or as components otherwise incorporated within a chassis of a larger system. For one embodiment, at least one processor 552 may be packaged together with computational logic 582 and configured to practice aspects of various example embodiments described herein to form a System in Package (SiP) or a System on Chip (SoC).

The node 550 includes processor circuitry in the form of one or more processors 552. The processor circuitry 552 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 552 may include one or more hardware accelerators (e.g., same or similar to acceleration circuitry 564), which may be microprocessors, programmable processing devices (e.g., FPGA, ASIC, etc.), or the like. The one or more accelerators may include, for example, computer vision and/or deep learning accelerators. In some implementations, the processor circuitry 552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 552 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 552 may be coupled with or may include memory/storage and may be configured to execute instructions 581 stored in the memory/storage to enable various applications or operating systems to run on the platform 550. The processors (or cores) 552 is configured to operate application software to provide a specific service to a user of the platform 550. In some embodiments, the processor(s) 552 may be a special-purpose processor(s)/controller(s) configured (or configurable) to operate according to the various embodiments herein.

As examples, the processor(s) 552 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 552 may be a part of a system on a chip (SoC), System-in-Package (SiP), a multi-chip package (MCP), and/or the like, in which the processor(s) 552 and other components are formed into a single integrated circuit, or a single package, such as the Edison™ or Galileo™ SoC boards from Intel® Corporation. Other examples of the processor(s) 552 are mentioned elsewhere in the present disclosure.

The node 550 may include or be coupled to acceleration circuitry 564, which may be embodied by one or more AI/ML accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 564 may comprise logic blocks or logic fabric and other interconnected resources that may be programmed (configured) to perform various functions, such as the procedures, methods, functions, etc. of the various embodiments discussed herein. In such implementations, the acceleration circuitry 564 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 552 and/or acceleration circuitry 564 may include hardware elements specifically tailored for machine learning functionality, such as for operating performing ANN operations such as those discussed herein. In these implementations, the processor circuitry 552 and/or acceleration circuitry 564 may be, or may include, an AI engine chip that can run many different kinds of AI instruction sets once loaded with the appropriate weightings and training code. Additionally or alternatively, the processor circuitry 552 and/or acceleration circuitry 564 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPsTM) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 552 and/or acceleration circuitry 564 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of node 550 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The node 550 also includes system memory 554. Any number of memory devices may be used to provide for a given amount of system memory. As examples, the memory 554 may be, or include, volatile memory such as random access memory (RAM), static RAM (SRAM), dynamic RAM (DRAM), synchronous DRAM (SDRAM), RAIVI-BUS® Dynamic Random Access Memory (RDRAM®), and/or any other desired type of volatile memory device. Additionally or alternatively, the memory 554 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 554 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs Storage circuitry 558 provides persistent storage of information such as data, applications, operating systems and so forth. In an example, the storage 558 may be implemented via a solid-state disk drive (SSDD) and/or high-speed electrically erasable memory (commonly referred to as "flash memory"). Other devices that may be used for the storage 558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 554 and/or storage circuitry 558 may also incorporate three-dimensional (3D) cross-point (XPOINT) memories from Intel® and Micron®.

The memory circuitry 554 and/or storage circuitry 558 is/are configured to store computational logic 583 in the form of software, firmware, microcode, or hardware-level instructions to implement the techniques described herein. The computational logic 583 may be employed to store working copies and/or permanent copies of programming instructions, or data to create the programming instructions, for the operation of various components of system 500 (e.g., drivers, libraries, application programming interfaces (APIs), etc.), an operating system of system 500, one or more applications, and/or for carrying out the embodiments discussed herein. The computational logic 583 may be stored or loaded into memory circuitry 554 as instructions 582, or data to create the instructions 582, which are then accessed for execution by the processor circuitry 552 to carry out the functions described herein. The processor circuitry 552 and/or the acceleration circuitry 564 accesses the memory circuitry 554 and/or the storage circuitry 558 over the IX 556. The instructions 582 direct the processor circuitry 552 to perform a specific sequence or flow of actions, for example, as described with respect to flowchart (s) and block diagram(s) of operations and functionality depicted previously. The various elements may be implemented by assembler instructions supported by processor circuitry 552 or high-level languages that may be compiled into instructions 581, or data to create the instructions 581, to be executed by the processor circuitry 552. The permanent copy of the programming instructions may be placed into persistent storage devices of storage circuitry 558 in the factory or in the field through, for example, a distribution medium (not shown), through a communication interface (e.g., from a distribution server (not shown)), over-the-air (OTA), or any combination thereof.

The IX 556 couples the processor 552 to communication circuitry 566 for communications with other devices, such as a remote server (not shown) and the like. The communication circuitry 566 is a hardware element, or collection of hardware elements, used to communicate over one or more networks 563 and/or with other devices. In one example, communication circuitry 566 is, or includes, transceiver circuitry configured to enable wireless communications using any number of frequencies and protocols such as, for example, the Institute of Electrical and Electronics Engineers (IEEE) 802.11 (and/or variants thereof), IEEE 802.15.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 566 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others. In some embodiments, the communication circuitry 566 may include or otherwise be coupled with the an accelerator 524 including one or more synaptic devices/structures 525, etc., as described previously.

The IX 556 also couples the processor 552 to interface circuitry 570 that is used to connect node 550 with one or more external devices 572. The external devices 572 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the node 550, which are referred to as input circuitry 586 and output circuitry 584 in FIG. 5. The input circuitry 586 and output circuitry 584 include one or more user interfaces designed to enable user interaction with the platform 550 and/or peripheral component interfaces designed to enable peripheral component interaction with the platform 550. Input circuitry 586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 584 may be included to show information or otherwise convey information, such as sensor readings, actuator position(s), or other like information. Data and/or graphics may be displayed on one or more user interface components of the output circuitry 584. Output circuitry 584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 550. The output circuitry 584 may also include speakers and/or other audio emitting devices, printer(s), and/or the like. Additionally or alternatively, sensor(s) may be used as the input circuitry 584 (e.g., an image capture device, motion capture device, or the like) and one or more actuators may be used as the output device circuitry 584 (e.g., an actuator to provide haptic feedback or the like). Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

The components of the node 550 may communicate over the interconnect (IX) 556. The IX 556 may include any number of technologies, including Industry Standard Architecture (ISA) and/or extended ISA (EISA), FASTBUS, Low Pin Count (LPC) bus, Inter-Integrated Circuit (I²C), Serial Peripheral Interface (SPI), power management bus (PMBus), peripheral component IX (PCI), PCI express (PCIe), PCI extended (PCIx), Intel® QuickPath IX (QPI), Intel® Ultra Path IX (UPI), Intel® Accelerator Link, Compute Express Link (CXL), Coherent Accelerator Processor Interface (CAPI) and/or OpenCAPI, Intel® Omni-Path Architecture (OPA), RapidIO™, cache coherent interconnect for accelerators (CCIX), Gen-Z Consortium, HyperTransport and/or Lightning Data Transport (LDT), NVLink provided by NVIDIA®, InfiniBand (IB), Time-Trigger Protocol (TTP), FlexRay, PROFIBUS, Ethernet, Universal Serial Bus (USB), point-to-point interfaces, and/or any number of other IX technologies. The IX 556 may be a proprietary bus, for example, used in a SoC based system.

The number, capability, and/or capacity of the elements of system 500 may vary, depending on whether computing system 500 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 500 may comprise one or more components of a data center, a desktop computer, a workstation, a laptop, a smartphone, a tablet, a digital camera, a smart appliance, a smart home hub, a network appliance, and/or any other device/system that processes data.

4. Example Implementations

Figure 6:
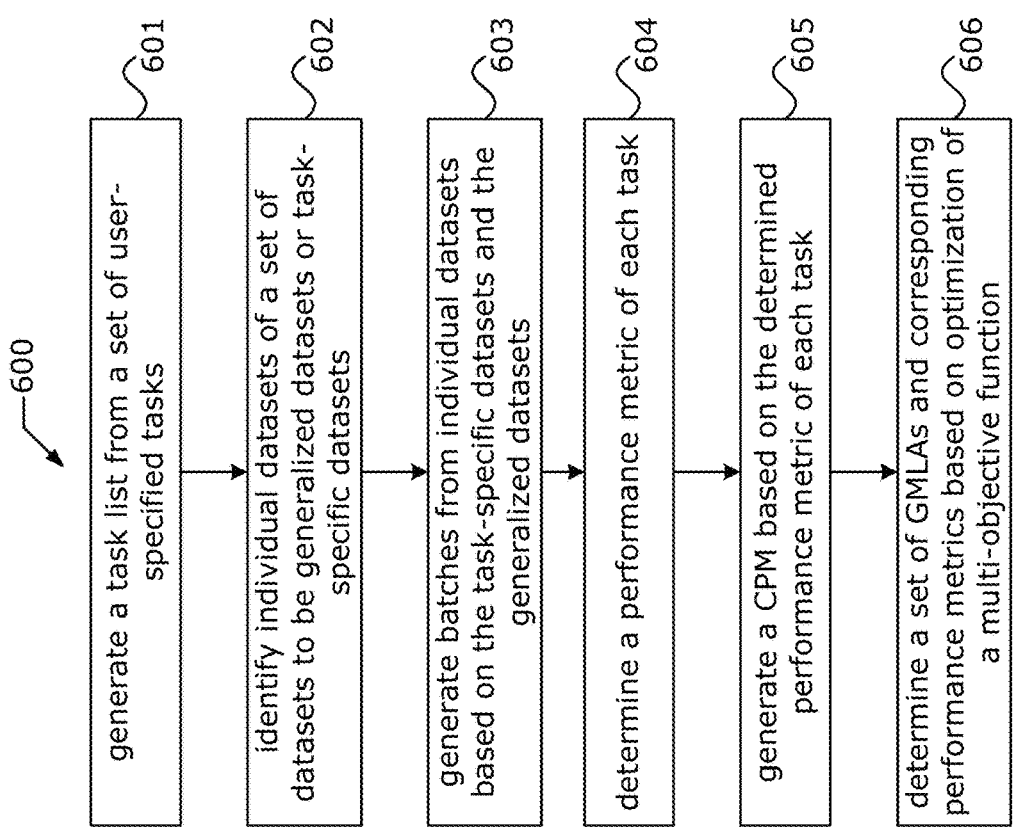

FIG. 6 depicts a process 600 for providing an MLAS engine 200. Process 600 begins at operation 601 where a task list 208a is generated from a set of user-specified tasks 205a. At operation 602, the MLAS engine 200 identifies individual datasets of a set of datasets 205b to be generalized datasets 208b or task-specific datasets 208c. The task-specific datasets 208c are datasets 205b that can only be used for one task in the task list 208a and the generalized datasets 208b are datasets 205b that can be used for more than one task in the task list 208a. At operation 603, the MLAS engine 200 generate one or more data batches 224 from individual datasets based on the task-specific datasets 208c and the generalized datasets 208b. At operation 604, the MLAS engine 200 determines a performance metric of each task in the task list 208a, and at operation 605, the MLAS engine 200 generate a CPM 225 based on the determined performance metrics of each task in the task list 208a. At operation 606, the MLAS engine 200 determines a set of GMLAs 132 and corresponding performance metrics 130 based on optimization of a multi-objective function. Each GMLA 132 of the set of GMLAs 132 is an ML architecture that can be used for more than one ML task 205a, 208a and using more than one type of dataset 205b, 208c. After operation 606, the process 600 may end or repeat as necessary.

Figure 7:
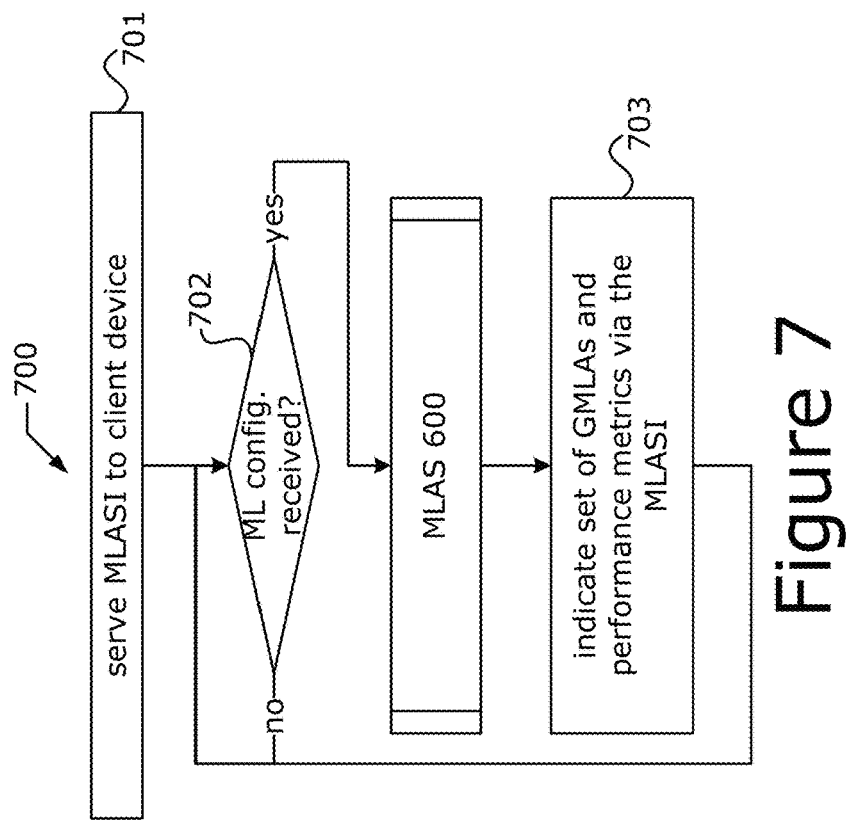
FIGS. 6 and 7 depict example procedures that may be used to practice the various embodiments discussed herein.

FIG. 7 depicts a process 700 for operating the MLASI 110, which may be performed by the MLAS system 100. Process 700 begins at operation 701 where the MLAS system 100 serves the MLASI 110b to the client device 101. Here, the client device 101 may operate the MLASI 110b to interact with the MLASI 110a as discussed previously. At operation 702, the MLAS system 100 determines whether an ML config. 105 has been received from the client device 101 through the MLASI 110. If no ML config. 105 has been received, the MLAS system 100 loops back to monitor for an ML config. 105. If an ML config. 105 has been received, the MLAS system 100 performs an MLAS such as by performing process 600 of FIG. 6. At operation 703, the MLAS system 100 indicates the discovered set of GMLAs 132 (e.g., as determined through process 600) and the determined performance metrics 130 for each discovered GMLA 132 via the MLASI 110. After operation 703, the MLAS system 100 loops back to operation 702 to check for a new or updated ML config. 105.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method for providing a machine learning architecture search (MLAS) engine, the method comprising: operating an input mapper to generate a task list from a set of specified tasks obtained from a client device, and identify individual datasets of a set of datasets to be generalized datasets or task-specific datasets, the task-specific datasets are datasets that can only be used for one task in the task list and the generalized datasets are datasets that can be used for more than one task in the task list; operating a multi-task batch generator to generate one or more data batches from the individual datasets based on identified ones of the task-specific datasets and the generalized datasets; operating a metric generator to determine a performance metric of each task in the task list, and generate a combined performance metric (CPM) based on the determined performance metric of each task; operating a multi-objective MLAS (MOMLAS) function to determine a set of generalized machine learning architectures (GMLAs) and corresponding performance metrics based on optimization of a multi-objective function, wherein each GMLA of the set of GMLAs is a machine learning (ML) architecture that can be used for more than one ML task and using more than one type of dataset; and operating an MLAS interface to provide the set of GMLAs and the corresponding performance metrics for deployment on a hardware platform.

Example A02 includes the method of example A01 and/or some other example(s) herein, wherein the CPM and one or more platform-based performance metrics are objectives of the multi-objective function and the set of GMLAs that are represented as decision variables of the multi-objective function.

Example A02.5 includes the method of example A01 and/or some other example(s) herein, wherein the CPM and one or more platform-based performance metrics are objectives of the multi-objective function and the set of GMLAs are a result of application of the multi-objective function.

Example A03 includes the method of example A02, A02.5, and/or some other example(s) herein, further comprising: operating the input mapper to: determine task-specific weights for corresponding tasks in the task list, wherein the task-specific weights indicate a preference of the corresponding tasks with respect to other tasks in the task list, and the task-specific weights are coefficients that correspond to respective ones of the decision variables in the multi-objective function.

Example A03.5 includes the method of example A02, A02.5, and/or some other example(s) herein, further comprising: operating the input mapper to: determine task-specific weights for corresponding tasks in the task list, wherein the task-specific weights indicate a preference of the corresponding tasks with respect to other tasks in the task list, and the task-specific weights are coefficients that correspond to respective ones of the performance metrics in the multi-objective function.

Example A04 includes the method of example A03, A03.5, and/or some other example(s) herein, further comprising: obtaining an ML configuration from a client device, the ML configuration including the set of specified tasks, the set of datasets, the task-specific weights, and the platform-based performance metrics.

Example A05 includes the method of examples A03-A04 and/or some other example(s) herein, further comprising: operating a system application programming interface (API) to pass the task list and the task-specific weights to the metric generator; and generate the individual datasets from the task-specific datasets and the generalized datasets such that the individual datasets correspond to a respective task in the task list.

Example A06 includes the method of examples A01-A05 and/or some other example(s) herein, further comprising: operating the input mapper is to identify the individual datasets to be generalized datasets or task-specific datasets using a predetermined or configured ruleset, the ruleset including one or more rules for mapping the individual datasets to a set of generalized datasets or a set of task-specific datasets.

Example A07 includes the method of examples A01-A06 and/or some other example(s) herein, further comprising: operating the multi-task batch generator is further to: apply one or more pre-processing techniques on the individual datasets based on a predefined or configured ruleset, wherein the ruleset defines rules for translating the individual datasets into a format that is readable by the MOMLAS function.

Example A08 includes the method of examples A01-A07 and/or some other example(s) herein, wherein operating the metric generator to determine the performance metric of each task in the task list comprises: operating the metric generator to select a performance metric for each task based on a predefined or configured ruleset.

Example A09 includes the method of example A08 and/or some other example(s) herein, wherein operating the metric generator to generate the CPM comprises: operating the metric generator to calculate the CPM from the selected performance metric for each task using a predefined or configured statistical function.

Example A10 includes the method of example A09 and/or some other example(s) herein, wherein the CPM is calculated using a configured statistical function, and the configured statistical function is included in an ML configuration provided by a client device.

Example A11 includes the method of examples A01-A10 and/or some other example(s) herein, wherein the multi-objective function includes one or more of a predetermined multi-objective evolutionary algorithm (MOEA), a predetermined Neural Architecture Search (NAS) algorithm, or a configured multi-objective function included in an ML configuration provided by a client device.

Example A12 includes the method of example A11 and/or some other example(s) herein, wherein the MOEA is Strength Pareto Evolutionary Algorithm 2 (SPEA-2) or Non-dominated Sorting Genetic Algorithm-II (NSGA-II).

Example A13 includes the method of examples A01-A12 and/or some other example(s) herein, wherein the set of GMLAs comprises a set of Pareto optimal solutions of the multi-objective function.

Example A14 includes the method of examples A01-A13 and/or some other example(s) herein, further comprising: operating the MOMLAS function to: operate each GMLA in the set of GMLAs using a test dataset; and measure the corresponding performance metrics based on the operation of respective GMLAs in the set of GMLAs.

Example A15 includes the method of examples A01-A14 and/or some other example(s) herein, further comprising: operating the MOMLAS function to: predict the corresponding performance metrics of each GMLA using one or more proxy functions, wherein the one or more proxy functions include one or more of associative arrays, mapping functions, dictionaries, hash tables, look-up tables (LUTs), linked lists, ML classifiers, parameter counting, computational throughput metrics, Jacobian covariance functions, saliency pruning functions, channel pruning functions, heuristic functions, and hyper-heuristic functions.

Example B01 includes a method for operating a machine learning architecture search interface (MLASI), the method comprising: serving the MLASI to a client device; and in response to receipt of an individual machine learning (ML) configuration from the client device via the MLASI: determining a set of ML tasks and a set of datasets indicated by the individual ML configuration, generating a task list the set of ML tasks, identifying individual datasets of the set of datasets to be generalized datasets or task-specific datasets, the task-specific datasets being datasets that can only be used for one task in the task list and the generalized datasets being datasets that can be used for more than one task in the task list, generating one or more data batches from individual datasets based on the task-specific datasets and the generalized datasets, determining a performance metric of each task in the task list, generating a combined performance metric (CPM) based on the determined performance metric of each task in the task list, determining a set of generalized machine learning architectures (GMLAs) and corresponding performance metrics based on optimization of a multi-objective function, wherein each GMLA of the set of GMLAs is a machine learning (ML) architecture that can be used for more than one ML task and using more than one type of dataset, and wherein the set of GMLAs comprises a set of Pareto optimal solutions of the multi-objective function, and indicating, via the MLASI, the set of GMLAs and the corresponding performance metrics for deployment on a hardware platform.

Example B02 includes the method of example B01 and/or some other example(s) herein, wherein the CPM and one or more platform-based performance metrics are objectives of the multi-objective function and the one or more GMLAs that are represented as decision variables of the multi-objective function.

Example B03 includes the method of example B02 and/or some other example(s) herein, further comprising: determining task-specific weights for corresponding tasks in the task list, wherein the task-specific weights indicate a preference of the corresponding tasks with respect to other tasks in the task list, and the task-specific weights are coefficients that correspond to respective ones of the decision variables in the multi-objective function.

Example B04 includes the method of example B03 and/or some other example(s) herein, wherein the individual ML configuration includes the set of specified tasks, the set of datasets, the task-specific weights, and the platform-based performance metrics.

Example B05 includes the method of examples B03-B04 and/or some other example(s) herein, further comprising: generating the individual datasets from the task-specific datasets and the generalized datasets such that the individual datasets correspond to a respective task in the task list.

Example B06 includes the method of examples B01-B05 and/or some other example(s) herein, further comprising: identifying the individual datasets to be generalized datasets or task-specific datasets using a predetermined or configured ruleset, the ruleset including one or more rules for mapping the individual datasets to a set of generalized datasets or a set of task-specific datasets.

Example B07 includes the method of examples B01-B06 and/or some other example(s) herein, further comprising: applying one or more pre-processing techniques on the individual datasets based on a predefined or configured ruleset, wherein the ruleset defines rules for translating the individual datasets into a format that is readable by the MOMLAS function.

Example B08 includes the method of examples B01-B07 and/or some other example(s) herein, wherein determining the performance metric of each task in the task list comprises: selecting a performance metric for each task based on a predefined or configured ruleset.

Example B09 includes the method of example B08 and/or some other example(s) herein, wherein generating the CPM comprises: calculating the CPM from the selected performance metric for each task using a predefined or configured statistical function.

Example B10 includes the method of example B01-B09 and/or some other example(s) herein, wherein the multi-objective function includes one or more of a predetermined multi-objective evolutionary algorithm (MOEA), a predetermined Neural Architecture Search (NAS) algorithm, or a configured multi-objective function included in an ML configuration provided by a client device.

Example Z01 includes one or more computer readable media comprising instructions, wherein execution of the instructions by processor circuitry is to cause the processor circuitry to perform the method of any one of examples A01-A15, B01-B10 and/or any other aspect discussed herein. Example Z02 includes a computer program comprising the instructions of example Z01. Example Z03 includes an Application Programming Interface defining functions, methods, variables, data structures, and/or protocols for the computer program of example Z02. Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01. Example Z08 includes an apparatus comprising means for executing the instructions of example Z01. Example Z09 includes a signal generated as a result of executing the instructions of example Z01. Example Z10 includes a data unit generated as a result of executing the instructions of example Z01. Example Z11 includes the data unit of example Z10, the data unit is a datagram, network packet, data frame, data segment, a Protocol Data Unit (PDU), a Service Data Unit (SDU), a message, or a database object. Example Z12 includes a signal encoded with the data unit of example Z10 or Z11. Example Z13 includes an electromagnetic signal carrying the instructions of example Z01. Example Z14 includes an apparatus comprising means for performing the method of any one of examples A01-A15, B01-B10 and/or any other aspect discussed herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "accuracy" at least in some embodiments refers to the closeness of one or more measurements to a specific value. The term "precision" at least in some embodiments refers to the closeness of the two or more measurements to each other.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single dataset or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment (UE), end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, Helmut-mounted display devices, augmented reality (AR) devices, virtual reality (VR) devices, mixed reality (MR) devices, and/or other like systems or devices.

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "reference" at least in some embodiments refers to data useable to locate other data and may be implemented a variety of ways (e.g., a pointer, an index, a handle, a key, an identifier, a hyperlink, etc.).

The term "artificial intelligence" or "AI" at least in some embodiments refers to any intelligence demonstrated by machines, in contrast to the natural intelligence displayed by humans and other animals. Additionally or alternatively, the term "artificial intelligence" or "AI" at least in some embodiments refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), generative adversarial network (GAN), restricted Boltzmann machine (RBM), transformers, and/or the like.

The term "attention" in the context of machine learning and/or neural networks, at least in some embodiments refers to a technique that mimics cognitive attention, which enhances important parts of a dataset where the important parts of the dataset may be determined using training data by gradient descent. The term "dot-product attention" at least in some embodiments refers to an attention technique that uses the dot product between vectors to determine attention. The term "multi-head attention" at least in some embodiments refers to an attention technique that combines several different attention mechanisms to direct the overall attention of a network or subnetwork.

The term "attention model" or "attention mechanism" at least in some embodiments refers to input processing techniques for neural networks that allow the neural network to focus on specific aspects of a complex input, one at a time until the entire dataset is categorized. The goal is to break down complicated tasks into smaller areas of attention that are processed sequentially. Similar to how the human mind solves a new problem by dividing it into simpler tasks and solving them one by one. The term "attention network" at least in some embodiments refers to an artificial neural networks used for attention in machine learning.

The term "backpropagation" at least in some embodiments refers to a method used in NNs to calculate a gradient that is needed in the calculation of weights to be used in the NN; "backpropagation" is shorthand for "the backward propagation of errors." Additionally or alternatively, the term "backpropagation" at least in some embodiments refers to a method of calculating the gradient of neural network parameters. Additionally or alternatively, the term "backpropagation" or "back pass" at least in some embodiments refers to a method of traversing a neural network in reverse order, from the output to the input layer through any intermediary hidden layers.

The term "Bayesian optimization" at least in some embodiments refers to a sequential design strategy for global optimization of black-box functions that does not assume any functional forms.

The term "classification" in the context of ML at least in some embodiments refers to an ML technique for determining the classes to which various data points belong. Here, the term "class" or "classes" at least in some embodiments refers to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The term "convolution" at least in some embodiments refers to a convolutional operation or a convolutional layer of a CNN.

The term "context" or "contextual information" at least in some embodiments refers to any information about any entity that can be used to effectively reduce the amount of reasoning required (via filtering, aggregation, and inference) for decision making within the scope of a specific application. Additionally or alternatively, the term "context" or "contextual information" at least in some embodiments refers to a high-dimensional real-valued vector.

The term "convolutional filter" at least in some embodiments refers to a matrix having the same rank as an input matrix, but a smaller shape. In machine learning, a convolutional filter is mixed with an input matrix in order to train weights.

The term "convolutional layer" at least in some embodiments refers to a layer of a DNN in which a convolutional filter passes along an input matrix (e.g., a CNN). Additionally or alternatively, the term "convolutional layer" at least in some embodiments refers to a layer that includes a series of convolutional operations, each acting on a different slice of an input matrix.

The term "convolutional neural network" or "CNN" at least in some embodiments refers to a neural network including at least one convolutional layer. Additionally or alternatively, the term "convolutional neural network" or "CNN" at least in some embodiments refers to a DNN designed to process structured arrays of data such as images.

The term "convolutional operation" at least in some embodiments refers to a mathematical operation on two functions (e.g., f and g) that produces a third function (f*g) that expresses how the shape of one is modified by the other where the term "convolution" may refer to both the result function and to the process of computing it. Additionally or alternatively, term "convolutional" at least in some embodiments refers to the integral of the product of the two functions after one is reversed and shifted, where the integral is evaluated for all values of shift, producing the convolution function. Additionally or alternatively, term "convolutional" at least in some embodiments refers to a two-step mathematical operation element-wise multiplication of the convolutional filter and a slice of an input matrix (the slice of the input matrix has the same rank and size as the convolutional filter); and (2) summation of all the values in the resulting product matrix.

The term "covariance" at least in some embodiments refers to a measure of the joint variability of two random variables, wherein the covariance is positive if the greater values of one variable mainly correspond with the greater values of the other variable (and the same holds for the lesser values such that the variables tend to show similar behavior), and the covariance is negative when the greater values of one variable mainly correspond to the lesser values of the other.

The term "ensemble averaging" at least in some embodiments refers to the process of creating multiple models and combining them to produce a desired output, as opposed to creating just one model.

The term "ensemble learning" or "ensemble method" at least in some embodiments refers to using multiple learning algorithms to obtain better predictive performance than could be obtained from any of the constituent learning algorithms alone.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in space-time). Additionally or alternatively, the term "event" at least in some embodiments refers to a notable occurrence at a particular point in time.

The term "experiment" in probability theory, at least in some embodiments refers to any procedure that can be repeated and has a well-defined set of outcomes, known as a sample space.

The term "feature" at least in some embodiments refers to an individual measureable property, quantifiable property, or characteristic of a phenomenon being observed. Additionally or alternatively, the term "feature" at least in some embodiments refers to an input variable used in making predictions. At least in some embodiments, features may be represented using numbers/numerals (e.g., integers), strings, variables, ordinals, real-values, categories, and/or the like.

The term "feature engineering" at least in some embodiments refers to a process of determining which features might be useful in training an ML model, and then converting raw data into the determined features. Feature engineering is sometimes referred to as "feature extraction."

The term "feature extraction" at least in some embodiments refers to a process of dimensionality reduction by which an initial set of raw data is reduced to more manageable groups for processing. Additionally or alternatively, the term "feature extraction" at least in some embodiments refers to retrieving intermediate feature representations calculated by an unsupervised model or a pre-trained model for use in another model as an input. Feature extraction is sometimes used as a synonym of "feature engineering."

The term "feature map" at least in some embodiments refers to a function that takes feature vectors (or feature tensors) in one space and transforms them into feature vectors (or feature tensors) in another space. Additionally or alternatively, the term "feature map" at least in some embodiments refers to a function that maps a data vector (or tensor) to feature space. Additionally or alternatively, the term "feature map" at least in some embodiments refers to a function that applies the output of one filter applied to a previous layer. In some embodiments, the term "feature map" may also be referred to as an "activation map".

The term "feature vector" at least in some embodiments, in the context of ML, refers to a set of features and/or a list of feature values representing an example passed into a model.

The term "forward propagation" or "forward pass" at least in some embodiments, in the context of ML, refers to the calculation and storage of intermediate variables (including outputs) for a neural network in order from the input layer to the output layer through any hidden layers between the input and output layers.

The term "hidden layer", in the context of ML and NNs, at least in some embodiments refers to an internal layer of neurons in an ANN that is not dedicated to input or output. The term "hidden unit" refers to a neuron in a hidden layer in an ANN.

The term "hyperparameter" at least in some embodiments refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, etc.); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some embodiments refers to a component of a computing system that applies logical rules to a knowledge base to deduce new information.

The terms "instance-based learning" or "memory-based learning" in the context of ML at least in some embodiments refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "intelligent agent" at least in some embodiments refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "iteration" at least in some embodiments refers to the repetition of a process in order to generate a sequence of outcomes, wherein each repetition of the process is a single iteration, and the outcome of each iteration is the starting point of the next iteration. Additionally or alternatively, the term "iteration" at least in some embodiments refers to a single update of a model's weights during training.

The term "knowledge base" at least in some embodiments refers to any technology used to store complex structured and/or unstructured information used by a computing system.

The term "knowledge distillation" in machine learning, at least in some embodiments refers to the process of transferring knowledge from a large model to a smaller one.

The term "loss function" or "cost function" at least in some embodiments refers to an event or values of one or more variables onto a real number that represents some "cost" associated with the event. A value calculated by a loss function may be referred to as a "loss" or "error". Additionally or alternatively, the term "loss function" or "cost function" at least in some embodiments refers to a function used to determine the error or loss between the output of an algorithm and a target value. Additionally or alternatively, the term "loss function" or "cost function" at least in some embodiments refers to a function are used in optimization problems with the goal of minimizing a loss or error.

The term "machine learning" or "ML" at least in some embodiments refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. Furthermore, the term "AI/ML application" or the like at least in some embodiments refers to an application that contains some AI/ML models and application-level descriptions. ML techniques generally fall into the following main types of learning problem categories: supervised learning, unsupervised learning, and reinforcement learning.

The term "mathematical model" at least in some embodiments refer to a system of postulates, data, and inferences presented as a mathematical description of an entity or state of affairs including governing equations, assumptions, and constraints.

The terms "model parameter" and/or "parameter" in the context of ML, at least in some embodiments refer to values, characteristics, and/or properties that are learnt during training. Additionally or alternatively, "model parameter" and/or "parameter" in the context of ML, at least in some embodiments refer to a configuration variable that is internal to the model and whose value can be estimated from the given data. Model parameters are usually required by a model when making predictions, and their values define the skill of the model on a particular problem. Examples of such model parameters / parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, etc., for natural language processing (NLP) and/or natural language understanding (NLU); and/or the like.

The term "momentum" at least in some embodiments refers to an aggregate of gradients in gradient descent. Additionally or alternatively, the term "momentum" at least in some embodiments refers to a variant of the stochastic gradient descent algorithm where a current gradient is replaced with m (momentum), which is an aggregate of gradients.

The term "objective function" at least in some embodiments refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" at least in some embodiments refers to a variable that represents a decision to be made. The term "objective" in the context of optimization at least in some embodiments refers to a function that may depend on one or more decision variables.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event.

The term "quantile" at least in some embodiments refers to a cut point(s) dividing a range of a probability distribution into continuous intervals with equal probabilities, or dividing the observations in a sample in the same way. The term "quantile function" at least in some embodiments refers to a function that is associated with a probability distribution of a random variable, and the specifies the value of the random variable such that the probability of the variable being less than or equal to that value equals the given probability. The term "quantile function" may also be referred to as a percentile function, percent-point function, or inverse cumulative distribution function.

The terms "regression algorithm" and/or "regression analysis" in the context of ML at least in some embodiments refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL.

The term "sample space" in probability theory (also referred to as a "sample description space" or "possibility space") of an experiment or random trial at least in some embodiments refers to a set of all possible outcomes or results of that experiment.

The term "self-attention" at least in some embodiments refers to an attention mechanism relating different positions of a single sequence in order to compute a representation of the sequence. Additionally or alternatively, the term "self-attention" at least in some embodiments refers to an attention mechanism applied to a single context instead of across multiple contexts wherein queries, keys, and values are extracted from the same context.

The term "softmax" or "softmax function" at least in some embodiments refers to a generalization of the logistic function to multiple dimensions; the "softmax function" is used in multinomial logistic regression and is often used as the last activation function of a neural network to normalize the output of a network to a probability distribution over predicted output classes.

The term "supervised learning" at least in some embodiments refers to an ML technique that aims to learn a function or generate an ML model that produces an output given a labeled dataset. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "tensor" at least in some embodiments refers to an object or other data structure represented by an array of components that describe functions relevant to coordinates of a space. Additionally or alternatively, the term "tensor" at least in some embodiments refers to a generalization of vectors and matrices and/or may be understood to be a multidimensional array. Additionally or alternatively, the term "tensor" at least in some embodiments refers to an array of numbers arranged on a regular grid with a variable number of axes. At least in some embodiments, a tensor can be defined as a single point, a collection of isolated points, or a continuum of points in which elements of the tensor are functions of position, and the Tensor forms a "tensor field". At least in some embodiments, a vector may be considered as a one dimensional (1D) or first order tensor, and a matrix may be considered as a two dimensional (2D) or second order tensor. Tensor notation may be the same or similar as matrix notation with a capital letter representing the tensor and lowercase letters with subscript integers representing scalar values within the tensor.

The term "unsupervised learning" at least in some embodiments refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some embodiments refers to ML algorithms that develop ML models from incomplete training data, where a portion of the sample input does not include labels.

The term "vector" at least in some embodiments refers to a tuple of one or more values called scalars, and a "feature vector" may be a vector that includes a tuple of one or more features.

The term "benchmark" or "benchmarking" at least in some embodiments refers to a measure of performance using a specific indicator resulting in a metric of performance. Additionally or alternatively, the term "benchmark" or "benchmarking" at least in some embodiments refers to the act of running a computer program, a set of programs, or other operations, in order to assess the relative performance of an object, normally by running a number of standard tests and trials against it.

The term "translation" at least in some embodiments refers to the process of converting or otherwise changing data from a first form, shape, configuration, structure, arrangement, embodiment, description, etc. into a second form, shape, configuration, structure, arrangement, embodiment, description, etc.; at least in some embodiments there may be two different types of translation: transcoding and transformation.

The term "transcoding" at least in some embodiments refers to taking information/data in one format (e.g., a packed binary format) and translating the same information/data into another format in the same sequence. Additionally or alternatively, the term "transcoding" at least in some embodiments refers to taking the same information, in the same sequence, and packaging that information (e.g., bits or bytes) differently. The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/ throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus for providing a machine learning (ML) architecture search (MLAS) engine, the apparatus comprising:
   interface circuitry to obtain a set of specified tasks from a client device;
   machine-readable instructions; and
   one or more processor circuits to be programmed by the machine-readable instructions to:
   generate a task list from the set of specified tasks, and group a set of datasets into a first sub-group of generalized datasets and a second sub-group of task-specific datasets, the task-specific datasets with a single task in the task list and the generalized datasets usable with more than one task in the task list;
   generate one or more data batches from the set of datasets based on ones of the task-specific datasets and the generalized datasets;
   determine respective performance metrics for tasks in the task list, and
   generate a combined performance metric (CPM) based on the performance metrics for the tasks;
   determine a set of generalized machine learning architectures (GMLAs) and corresponding platform-based performance metrics based on the CPM and the one or more data batches, wherein a GMLA of the set of GMLAs is a machine learning (ML) architecture that can be used for more than one ML task and with the task-specific datasets and the generalized datasets; and
   provide the set of GMLAs and the corresponding performance metrics for deployment on a hardware platform.

2. The apparatus of claim 1, wherein the CPM and the platform-based performance metrics are objectives of a multi-objective function and the set of GMLAs are a result of application of the multi-objective function.

3. The apparatus of claim 2, wherein at least one of the one or more processor circuits is to determine task-specific weights for corresponding tasks in the task list, wherein the task-specific weights indicate a preference of the corresponding tasks with respect to other tasks in the task list, and the task-specific weights are coefficients that correspond to respective ones of the platform-based performance metrics in the multi-objective function.

4. The apparatus of claim 3, wherein the interface circuitry is to obtain an ML configuration from the client device, the ML configuration including the set of specified tasks, the set of datasets, the task-specific weights, and the platform-based performance metrics.

5. The apparatus of claim 3, wherein at least one of the one or more processor circuits is to:
   generate individual datasets from the task-specific datasets and the generalized datasets such that the individual datasets correspond to a respective task in the task list.

6. The apparatus of claim 2, wherein the multi-objective function includes one or more of a predetermined multi-objective evolutionary algorithm (MOEA), a predetermined Neural Architecture Search (NAS) algorithm, or a configured multi-objective function included in an ML configuration provided by the client device.

7. The apparatus of claim 2, wherein the the multi-objective function is Strength Pareto Evolutionary Algorithm 2 (SPEA-2) or Non-dominated Sorting Genetic Algorithm-II (NSGA-II).

8. The apparatus of claim 2, wherein the set of GMLAs includes a set of Pareto optimal solutions of the multi-objective function.

9. The apparatus of claim 1, wherein at least one of the one or more processor circuits is to group the set of datasets into the first sub-group of generalized datasets or the second sub-group of task-specific datasets using a predetermined or configured ruleset, the ruleset including one or more rules for grouping the set of datasets to the first sub-group of generalized datasets and the second sub-group of task-specific datasets.

10. The apparatus of claim 1, wherein at least one of the one or more processor circuits is to apply one or more pre-processing techniques on individual datasets of the set of datasets based on a predefined or configured ruleset, wherein the ruleset defines rules for translating the individual datasets into a format that is readable by a multi-objective MLAS function.

11. The apparatus of claim 1, wherein the at least one of the one or more processor circuits is to determine the respective performance metrics for the tasks in the task list based on a predefined or configured ruleset.

12. The apparatus of claim 11, wherein, to generate the CPM, at least one of the one or more processor circuits is to calculate the CPM from the respective performance for the tasks using a predefined or configured statistical function.

13. The apparatus of claim 12, wherein the configured statistical function is included in an ML configuration provided by the client device.

14. The apparatus of claim 1, wherein the at least one of the one or more processor circuits is to:
   operate respective GMLAs in the set of GMLAs using a test dataset; and
   measure the corresponding performance metrics based on the operation of the respective GMLAs in the set of GMLAs.

15. The apparatus of claim 1, wherein at least one of the one or more processor circuits is to predict the corresponding platform-based performance metrics of each GMLA using one or more proxy functions, wherein the one or more proxy functions include one or more of associative arrays, mapping functions, dictionaries, hash tables, look-up tables (LUTs), linked lists, ML classifiers, parameter counting, computational throughput metrics, Jacobian covariance functions, saliency pruning functions, channel pruning functions, heuristic functions, and hyper-heuristic functions.

16. One or more non-transitory computer readable media (NTCRM) comprising instructions to cause one or more processor circuits to at least:

serve a machine learning architecture search interface (MLASI) to a client device;

after receipt of an individual machine learning (ML) configuration from the client device via the MLASI, determine a set of ML tasks and a set of datasets indicated by the individual ML configuration;

generate a task list from the set of ML tasks;

group the set of datasets into a first sub-group of generalized datasets and a second sub-group of task-specific datasets, the task-specific datasets usable with a single task in the task list and the generalized datasets usable with more than one task in the task list;

generate one or more data batches from individual datasets based on the task-specific datasets and the generalized datasets;

determine respective performance metrics for tasks in the task list;

generate a combined performance metric (CPM) based on the performance metrics for the tasks;

determine a set of generalized machine learning architectures (GMLAs) and corresponding platform-based performance metrics based on the CPM and the one or more data batches, wherein a GMLA of the set of GMLAs is a machine learning (ML) architecture that can be used for more than one ML task and with the task-specific datasets and the generalized datasets; and indicate, via the MLASI, the set of GMLAs and the corresponding performance metrics for deployment on a hardware platform.

17. The one or more NTCRM of claim 16, wherein the CPM and the platform-based performance metrics are objectives of a multi-objective function and the one or more GMLAs that are represented as decision variables of the multi-objective function.

18. The one or more NTCRM of claim 17, wherein the instructions are to cause at least one of the one or more processor circuits to determine task-specific weights for corresponding tasks in the task list, wherein the task-specific weights indicate a preference of the corresponding tasks with respect to other tasks in the task list, and the task-specific weights are coefficients that correspond to respective ones of the decision variables in the multi-objective function.

19. The one or more NTCRM of claim 18, wherein the individual ML configuration includes the set of specified tasks, the set of datasets, the task-specific weights, and the platform-based performance metrics.

20. The one or more NTCRM of claim 18, wherein the instructions are to cause at least one of the one or more processor circuits to generate individual datasets from the task-specific datasets and the generalized datasets such that the individual datasets correspond to a respective task in the task list.

21. The one or more NTCRM of claim 17, wherein the multi-objective function includes one or more of a predetermined multi-objective evolutionary algorithm (MOEA), a predetermined Neural Architecture Search (NAS) algorithm, or a configured multi-objective function included in an ML configuration provided by the client device.

22. The one or more NTCRM of claim 16, wherein the instructions are to cause at least one of the one or more processor circuits to group the set of datasets to the first sub-group of generalized datasets the second sub-group of task-specific datasets using a predetermined or configured ruleset, the ruleset including one or more rules for grouping the set of datasets to the first sub-group of generalized datasets and the second sub-group of task-specific datasets.

23. The one or more NTCRM of claim 16, wherein the instructions are to cause at least one of the one or more processor circuits to apply one or more pre-processing techniques on individual datasets of the datasets based on a predefined or configured ruleset, wherein the ruleset defines rules for translating the individual datasets into a format that is readable by the a multi-objective MLAS function.

24. The one or more NTCRM of claim 16, wherein the instructions to cause the at least one of the one or more processor circuits to determine the respective performance metrics for the tasks in the task list based on a predefined or configured ruleset.

25. The one or more NTCRM of claim 24, wherein, to generate the CPM, the instructions are to cause at least one of the one or more processor circuits to calculate the CPM from the respective performance for the tasks using a predefined or configured statistical function.

* * * * *